(12) United States Patent
Choi

(10) Patent No.: US 12,353,697 B2
(45) Date of Patent: Jul. 8, 2025

(54) ELECTRONIC APPARATUS AND UI PROVIDING METHOD THEREOF

(71) Applicant: SAMSUNG ELECTRONICS CO., LTD., Suwon-si (KR)

(72) Inventor: Seunghwan Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 175 days.

(21) Appl. No.: 18/221,650

(22) Filed: Jul. 13, 2023

(65) Prior Publication Data

US 2024/0069710 A1 Feb. 29, 2024

Related U.S. Application Data

(63) Continuation of application No. PCT/KR2023/006722, filed on May 18, 2023.

(30) Foreign Application Priority Data

Aug. 24, 2022 (KR) ........................ 10-2022-0106322

(51) Int. Cl.
*G06F 3/04847* (2022.01)
*H04N 21/431* (2011.01)

(52) U.S. Cl.
CPC ..... *G06F 3/04847* (2013.01); *H04N 21/4312* (2013.01)

(58) Field of Classification Search
None
See application file for complete search history.

(56) References Cited

U.S. PATENT DOCUMENTS 9,571,625 B2 * 2/2017 Kim .................. H04M 1/72469
9,998,582 B2 6/2018 Park et al.
(Continued)

FOREIGN PATENT DOCUMENTS

KR 10-0879218 B1 1/2009
KR 10-2016-0119989 A 10/2016
(Continued)

OTHER PUBLICATIONS

International Search Report (PCT/ISA/210) issued on Sep. 13, 2023 by the International Searching Authority in International Patent Application No. PCT/KR2023/006722.
(Continued)

*Primary Examiner* — Tuan S Nguyen
(74) *Attorney, Agent, or Firm* — Sughrue Mion, PLLC

(57) ABSTRACT

An electronic apparatus includes: a display; a memory storing at least one instruction; and a processor configured to execute the at least one instruction to: based on a user command for executing a peripheral device control function being identified, identify a screen state of the display, control the display to display a user interface (UI) screen corresponding to the peripheral device control function at a whole area of the display by turning on the display based on the identified screen state being in a turned off state, identify a UI type from among a plurality of UI types with a different size based on at least one of a content type or a display state of content displayed on the display, and control the display to display a UI screen corresponding to the peripheral device control function at a partial area of the display based on the identified UI type.

20 Claims, 35 Drawing Sheets

(56) References Cited

U.S. PATENT DOCUMENTS

| | | |
|---|---|---|
| 10,216,398 B2 | 2/2019 | Woo et al. |
| 10,235,037 B2 | 3/2019 | Kim et al. |
| 10,290,205 B2 | 5/2019 | Lee et al. |
| 11,137,890 B2 | 10/2021 | Woo et al. |
| 11,457,275 B2 | 9/2022 | Batmunkh |
| 2012/0173177 A1 | 7/2012 | Nishiyama et al. |
| 2014/0351744 A1* | 11/2014 | Jeon .................. H04M 1/72448 715/781 |
| 2016/0306534 A1 | 10/2016 | Woo et al. |
| 2016/0381201 A1* | 12/2016 | Park .................. H04M 1/72415 455/557 |
| 2017/0206779 A1* | 7/2017 | Lee ....................... G08C 17/02 |
| 2017/0351351 A1 | 12/2017 | Kim et al. |
| 2019/0155492 A1 | 5/2019 | Woo et al. |
| 2021/0390893 A1 | 12/2021 | Woo et al. |

FOREIGN PATENT DOCUMENTS

| | | |
|---|---|---|
| KR | 10-2016-0137362 A | 11/2016 |
| KR | 10-2017-0001254 A | 1/2017 |
| KR | 10-2017-0086750 A | 7/2017 |
| KR | 10-2017-0100485 A | 9/2017 |
| KR | 10-2019-0083443 A | 7/2019 |
| KR | 10-2020-0075809 A | 6/2020 |
| KR | 10-2294600 A | 8/2021 |

OTHER PUBLICATIONS

Written Opinion (PCT/ISA/237) issued on Sep. 13, 2023by the International Searching Authority in International Patent Application No. PCT/KR2023/006722.

\* cited by examiner

ELECTRONIC APPARATUS AND UI PROVIDING METHOD THEREOF

CROSS-REFERENCE TO RELATED APPLICATION(S)

This application is a bypass continuation of PCT International Application No. PCT/KR2023/006722, which was filed on May 18, 2023, and claims priority to Korean Patent Application No. 10-2022-0106322, filed on Aug. 24, 2022, in the Korean Intellectual Property Office, the disclosures of which are incorporated herein by reference in their entireties.

BACKGROUND

1. Field

The disclosure relates to a user terminal and a control method thereof, and more particularly, to an electronic apparatus that provides a user interface (UI) for controlling peripheral devices and a method of providing the UI.

2. Description of Related Art

With developments in electronic technology, electronic devices of various types are being developed and supplied. In particular, home appliances that are used in households have been under continuous development to satisfy the needs of users.

Recently, methods for controlling home appliances within a home are being supplied through applications installed in devices such as a television (TV). For example, a UI for controlling a home appliance within a home may be provided on a TV screen.

SUMMARY

According to an aspect of the disclosure, an electronic apparatus includes: a display; a memory storing at least one instruction; and at least one processor configured to execute the at least one instruction to: based on a user command for executing a peripheral device control function being identified, identify a screen state of the display, control the display to display a user interface (UI) screen corresponding to the peripheral device control function at a whole area of the display by turning on the display based on the identified screen state being in a turned off state, based on the identified screen state being in a turned on state, identify a UI type with a different size, from among a plurality of UI types, based on at least one of a content type or a display state of content displayed on the display, and control the display to display a UI screen corresponding to the peripheral device control function at a partial area of the display based on the identified UI type.

The at least one processor may be further configured to execute the at least one instruction to: based on the identified screen state being in a turned on state, identify whether an image content is displayed at a whole area of the display, and based on the image content being identified as displayed at the whole area of the display, identify the UI type from among the plurality of UI types based on at least one of a type of the image content or a playback state of the image content.

The at least one processor may be further configured to execute the at least one instruction to: based on the image content being identified as displayed at the whole area of the display, identify whether the image content is content selected by a user, based on the image content being identified as content selected by the user, display a UI screen corresponding to the peripheral device control function at a partial area of the display based on a first type UI, and based on the image content being identified as not the content selected by the user, display a UI screen corresponding to the peripheral device control function at a partial area of the display based on a second type UI, and the second type UI may be greater in size than the first type UI.

The at least one processor may be further configured to execute the at least one instruction to: based on the image content being identified as displayed at the whole area of the display, identify whether the image content is being played back normally, based on the image content being identified as being played back normally, display a UI screen corresponding to the peripheral device control function at a partial area of the display based on a first type UI, and based on the image content being identified as not being played back normally, display a UI screen corresponding to the peripheral device control function at a partial area of the display based on a second type UI, and the second type UI may be greater in size than the first type UI.

The at least one processor may be further configured to execute the at least one instruction to: based on the identified screen state being in a turned on state, identify whether the image content is displayed at the whole area of the display, and based on the image content being identified as not displayed at the whole area of the display, identify the UI type from among the plurality of UI types based on at least one of a priority of the content type displayed in at least a partial area of the display or a priority of a UI screen for controlling the peripheral device.

The at least one processor may be further configured to execute the at least one instruction to, based on the image content being identified as not displayed at the whole area of the display, identify a level of user operation required for content that is displayed in at least a partial area of the display, based on the level of user operation required being greater than or equal to a threshold level required, display a UI screen corresponding to the peripheral device control function at a partial area of the display based on a first type UI, and based on the level of user operation required being less than the threshold level required, display a UI screen corresponding to the peripheral device control function at a partial area of the display based on a second type UI, and the second type UI may be greater in size than the first type UI.

The at least one processor may be further configured to execute the at least one instruction to: based on a first content being displayed at a partial area of the display and a second content being displayed at a remaining area of the display, identify the UI type from among the plurality of UI types based on a type of the first content and a type of the second content; identify an area of the display at which the UI screen is to be displayed based on the type of the first content and the type of the second content; and control the display to display a UI screen corresponding to the peripheral device control function at an identified area of the display based on the identified UI type.

The at least one processor may be further configured to execute the at least one instruction to, based on a user command being displayed on the display for executing the peripheral device control function being identified in an art mode in which an art content is displayed, control the display to display a UI screen corresponding to the peripheral device control function at the whole area of the display.

The at least one processor may be further configured to execute the at least one instruction to, based on notification information associated with an operation of the peripheral device being received, provide a guide UI including the notification information in a different form according to the screen state of the display.

The at least one processor may be further configured to execute the at least one instruction to: based on the identified screen state being in a turned on state, identify a position to display the UI screen based on at least one content type displayed in the display and a display state of the at least one content, and control the display to display the UI screen at the identified position.

According to an aspect of the disclosure, a method of providing a user interface (UI), includes: based on a user command for executing a peripheral device control function being identified, identifying a screen state of a display; based on the identified screen state being in a turned off state, displaying a UI screen corresponding to the peripheral device control function at a whole area of the display by turning on the display; based on the identified screen state being in a turned on state, identifying a UI type from a plurality of UI types with a different size based on at least one of a content type being displayed in the display or a display state of content; and displaying a UI screen corresponding to the peripheral device control function at a partial area of the display based on the identified UI type.

The identifying the UI type with the different size from the plurality of UI types may include: based on the identified screen state being in a turned on state, identifying whether an image content is being displayed at the whole area of the display; and based on the image content being identified as displayed at the whole area of the display, identifying the UI type from the plurality of UI types based on at least one of a type of the image content or a playback state of the image content.

The method may further include: based on the image content being identified as displayed at the whole area of the display, identifying whether the image content is content selected by a user; based on the image content being identified as content selected by the user, displaying a UI screen corresponding to the peripheral device control function at a partial area of the display based on a first type UI; and based on the image content being identified as content not selected by the user, displaying a UI screen corresponding to the peripheral device control function at a partial area of the display based on a second type UI, and the second type UI may be greater in size than the first type UI.

The method may further include: based on the image content being identified as displayed at the whole area of the display, identifying whether the image content is being played back normally; based on the image content being identified as being played back normally, displaying a UI screen corresponding to the peripheral device control function at a partial area of the display based on a first type UI; and based on the image content being identified as not being played back normally, displaying a UI screen corresponding to the peripheral device control function at a partial area of the display based on a second type UI, and the second type UI is greater in size than the first type UI.

The identifying the UI type with the different size from the plurality of UI types may include: based on the identified screen state being in a turned on state, identifying whether an image content is being displayed at the whole area of the display device; and based on the image content being identified as not displayed at the whole area of the display device, identifying the UI type from the plurality of UI types based on at least one of a priority of the content type displayed in at least a partial area of the display device or a priority of a UI screen for controlling the peripheral device.

The identifying the UI type with the different size from the plurality of UI types may include: based on the identified screen state being in a turned on state, identifying whether an image content is being displayed at the whole area of the display device; and based on the image content being identified as not displayed at the whole area of the display device, identifying the UI type from the plurality of UI types based on a level of user operation required for content that is displayed in at least a partial area of the display device.

The method may further include: based on the level of user operation required being greater than or equal to a threshold level required, displaying a UI screen corresponding to the peripheral device control function at a partial area of the display device based on a first type UI; and based on the level of user operation required being less than the threshold level required, displaying a UI screen corresponding to the peripheral device control function at a partial area of the display device based on a second type UI, and the second type UI is greater in size than the first type UI.

The method may further include: based on a first content being displayed at a partial area of the display device and a second content being displayed at a remaining area of the display device, identifying the UI type from among the plurality of UI types based on a type of the first content and a type of the second content; identifying an area of the display device at which the UI screen is to be displayed based on the type of the first content and the type of the second content; and controlling the display device to display a UI screen corresponding to the peripheral device control function at an identified area of the display device based on the identified UI type.

The method may further include: based on the identified screen state being in a turned on state, identifying a position to display the UI screen based on at least one content type displayed in the display device, and a display state of the at least one content; and controlling the display device to display the UI screen at the identified position.

According to an aspect of the disclosure, non-transitory computer readable medium stores computer readable program code or instructions which are executable by a processor to perform a method of providing a user interface (UI), the method including: based on a user command for executing a peripheral device control function being identified, identifying a screen state of a display; based on the identified screen state being in a turned off state, displaying a UI screen corresponding to the peripheral device control function at a whole area of the display by turning on the display; based on the identified screen state being in a turned on state, identifying a UI type from among a plurality of UI types with a different size based on at least one of a content type being displayed in the display or a display state of content; and displaying a UI screen corresponding to the peripheral device control function at a partial area of the display based on the identified UI type.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
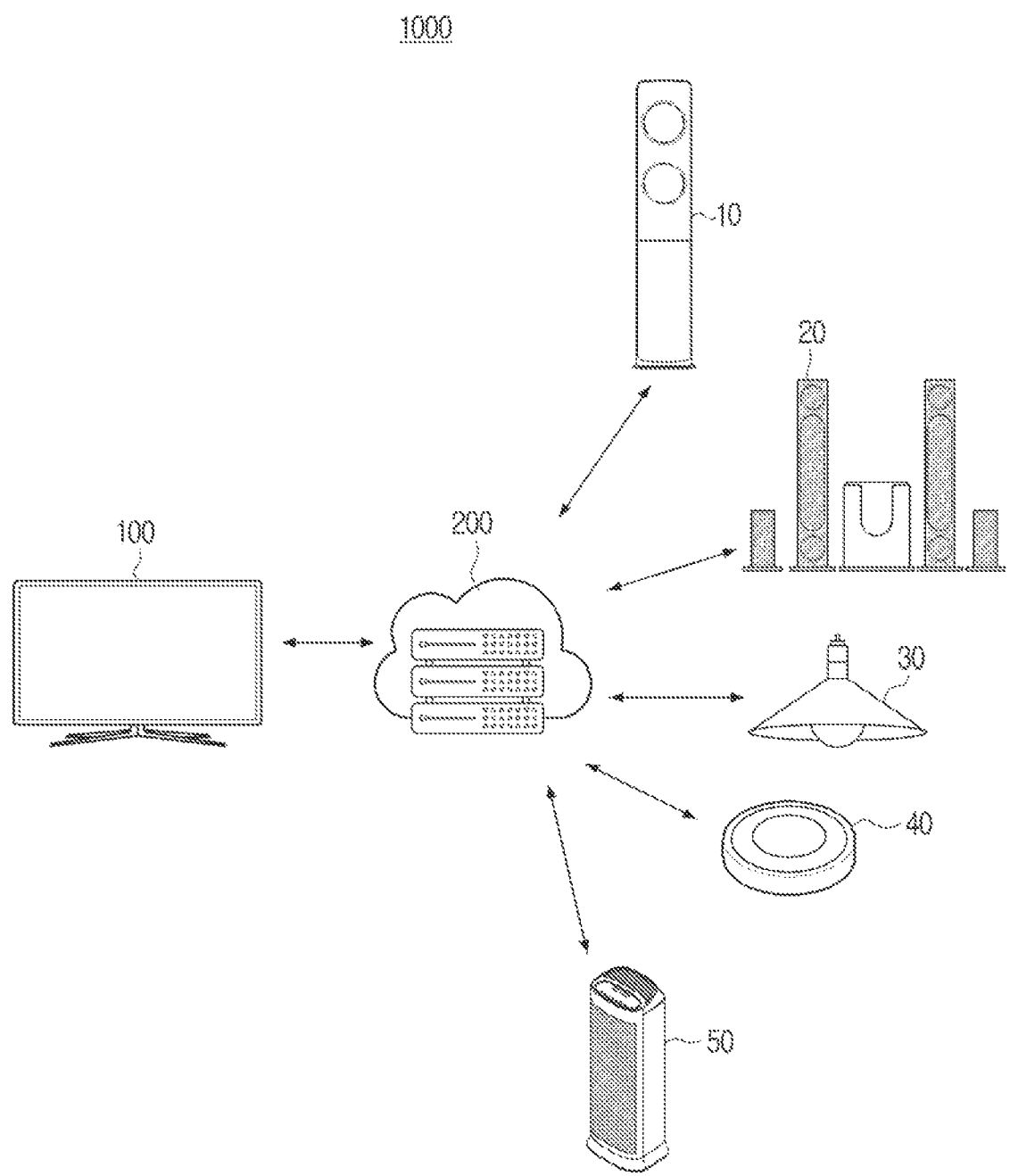
FIG. 1 is a diagram illustrating a network system according to one or more embodiments.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

Terms used in the disclosure will be briefly described, and the disclosure will be described in detail.

The terms used in describing one or more embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

The expression "at least one of A or B" is to be understood as indicating any one of "A," "B," or "A and B."

Expressions such as "first," "second," "1st," "2nd," and so on used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

A singular expression includes a plural expression, unless otherwise specified. It is to be understood that the terms such as "configured" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in one or more embodiments herein perform at least one function or operation, and may be implemented with a hardware or software, or implemented with a combination of hardware and software. Further, a plurality of "modules" or a plurality of "parts," except for a "module" or a "part" which needs to be implemented to a specific hardware, may be integrated to at least one module and implemented in at least one processor (not shown).

Hereinafter, embodiments of the present disclosure will be described in detail with reference to the accompanying drawings, where similar reference characters denote corresponding features consistently throughout.

FIG. 1 is a diagram illustrating a network system according to one or more embodiments.

Referring to FIG. 1, a network system 1000 may include an electronic apparatus 100, a server 200, and a plurality of peripheral devices 10, 20, 30, 40, and 50.

The network system 1000 may be implemented as a home network system capable of a two-way communication in which all electronic devices that are used in a specific space, for example, a household, are connected through one communication system, but so long as it is a system that connects and controls a plurality of devices through a network, it may applicable without being limited to the above. For example, a system that connects and controls devices within a company through a network may be included therein.

The server 200 may control and manage various devices (e.g., home appliances, Internet of Things (IoT) devices, etc.) registered in the server 200. Here, the server 200 may be implemented as a home server, a cloud server, a gateway device, or a network server, but is not limited thereto. According to an embodiment, the server 200 may generate, based on a user command received from the electronic apparatus 100, control information for controlling at least one device from among the plurality of devices 10, 20, 30, 40, and 50 and transfer to a corresponding device. The plurality of devices 10, 20, 30, 40, and 50 may be various Internet of Things (IoT) devices that are controllable through an application (or a program) installed in the electronic apparatus 100.

For example, when the network system 1000 is constructed as in FIG. 1, the server 200 may store control information (or a control signal) capable of controlling various functions that can be provided in an air conditioner 10, a home theater 20, lighting 30, a robot cleaner 40, and an air purifier 50, and transmit the control information corresponding to the user command to each device.

The electronic apparatus 100 may receive input of a user command for controlling a peripheral device and transmit to the server 200. For example, the electronic apparatus 100 may execute a peripheral device control function based on user commands such as, for example, and without limitation, a remote controller signal, a user voice, a user gesture, and the like and provide a user interface (UI) screen for controlling the peripheral device. According to an embodiment, the electronic apparatus 100 may be implemented as a television (TV), but is not necessarily limited thereto, and may be implemented as a tablet, a smartphone, a notebook, a laptop, a digital information display (DID), a kiosk, a large format display (LFD), an electronic blackboard, and the like.

According to an embodiment, the electronic apparatus 100 may provide a UI screen in a different form based on a current screen state of the electronic apparatus 100 when the peripheral device control function is executed. Various embodiments associated therewith will be described below with reference to the drawings.

Figure 2A:
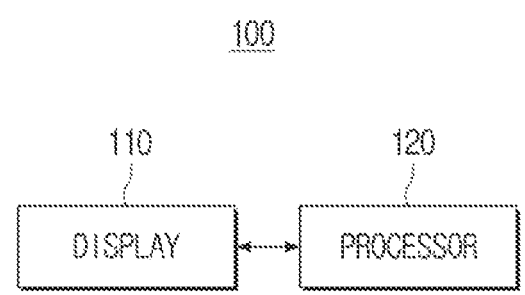
FIG. 2A is a block diagram illustrating a configuration of an electronic apparatus according to one or more embodiments.

FIG. 2A is a block diagram illustrating a configuration of an electronic apparatus according to one or more embodiments.

Referring to FIG. 2A, the electronic apparatus 100 may include a display 110 and at least one processor 120 (hereinafter referred to as a processor).

The display 110 may be implemented as a display including emissive devices or a display including non-emissive devices and a backlight. For example, the display 110 may be implemented as a display of various types such as, for example, and without limitation, a liquid crystal display (LCD), an organic light emitting diode (OLED) display, a light emitting diodes (LED), a micro LED, a mini LED, a plasma display panel (PDP), a quantum dot (QD) display, a quantum dot light-emitting diodes (QLED), or the like. In the display 110, a driving circuit, which may be implemented in the form of an a-si TFT, a low temperature poly silicon (LTPS) TFT, an organic TFT (OTFT), or the like, a backlight unit, and the like may be included. The display 110 may be implemented as a flexible display, a rollable display, a three-dimensional display (3D display), a display physically coupled with a plurality of display modules, or the like.

The processor 120 may control an overall operation of the electronic apparatus 100. Specifically, the processor 120 may be coupled with each configuration of the electronic apparatus 100 and control the overall operation of the electronic apparatus 100. For example, the processor 120 may be electronically coupled with the display 110 and a memory 150 (FIG. 2B) and control the overall operation of the electronic apparatus 100. The processor 120 may be configured of one or a plurality of processors.

The processor 120 may perform, by executing at least one instruction stored in the memory 150, an operation of the electronic apparatus 100 according to one or more embodiments.

According to one or more embodiments, the processor 120 may be implemented as a plurality of processors, such as a digital signal processor (DSP) that processes a digital image signal, a microprocessor, a graphics processing unit (GPU), an artificial intelligence (AI) processor, a neural processing unit (NPU), or a time controller (TCON). However, the one or more embodiments are not limited thereto, and may include, for example, and without limitation, one or more from among a central processing unit (CPU), a micro controller unit (MCU), a micro processing unit (MPU), a controller, an application processor (AP), a communication processor (CP), an ARM processor, or the like, or may be defined by the corresponding term. In addition, the processor 120 may be implemented as a System on Chip (SoC) or a large scale integration (LSI) in which a processing algorithm is embedded, and may be implemented in the form of an application specific integrated circuit (ASIC) and a field programmable gate array (FPGA).

Figure 2B:
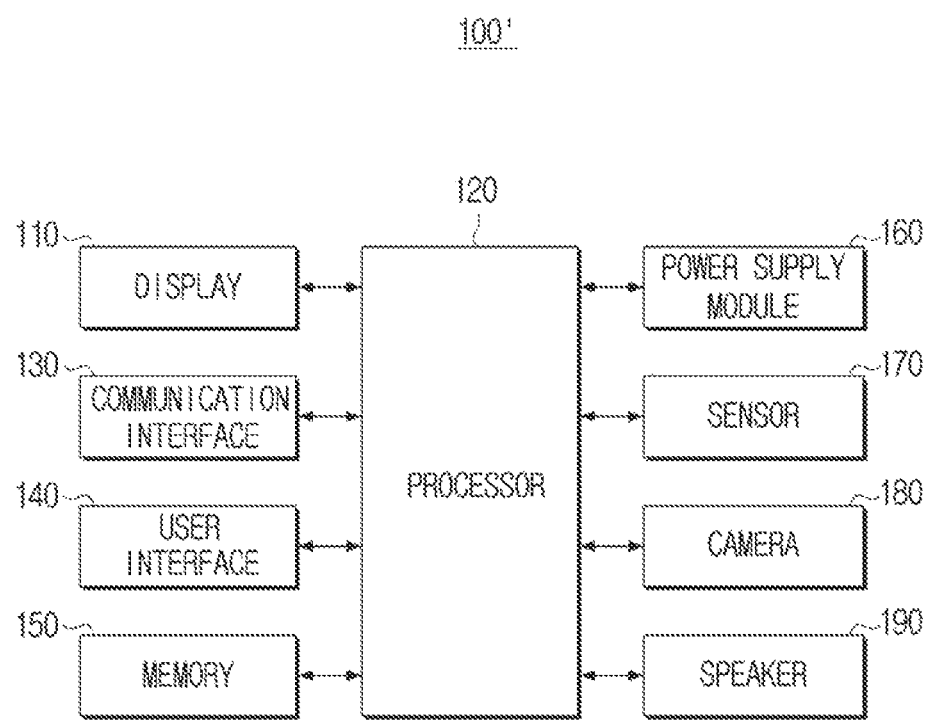
FIG. 2B is a diagram illustrating a detailed configuration of an electronic apparatus according to one or more embodiments.

FIG. 2B is a diagram illustrating a detailed configuration of an electronic apparatus according to one or more embodiments.

Referring to FIG. 2B, an electronic apparatus 100' may include the display 110, the processor 120, a communication interface 130, a user interface 140, the memory 150, a power supply part 160, a sensor 170, a camera 180 and a speaker 190. Detailed descriptions of configurations that overlap with the configurations shown in FIG. 2A from among the configurations shown in FIG. 2B may be omitted.

The communication interface 130 may perform communication with an external device. According to an embodiment, the communication interface 130 may perform communication with at least one from among the server 200 or the peripheral devices 10 to 50 in FIG. 1.

The communication interface 130 may perform communication with an external device, an external storage medium (e.g., a universal serial bus (USB) memory), an external server (e.g., WEBHARD), or the like, through communication methods such as, for example, and without limitation, an AP based Wi-Fi (e.g., Wi-Fi, wireless LAN network), Bluetooth, ZigBee, a wired/wireless local area network (LAN), a wide area network (WAN), Ethernet, IEEE 1394, a mobile high-definition link (MHL), Audio Engineering Society/European Broadcasting Union (AES/EBU), Optical, Coaxial, or the like.

The user interface 140 may be implemented with a device such as a button, a touch pad, a mouse, and a keyboard, or implemented with a touch screen with which the above-described display function and an operation input function may be performed together therewith. According to one or more embodiments, the user interface 140 may be implemented as a remote controller transceiver and may receive a remote control signal. The remote controller transceiver may receive a remote controller signal from an external remote control device or transmit the remote controller signal through at least one communication method from among an infrared communication method, a Bluetooth communication method, or a Wi-Fi communication method.

The memory 150 may be electrically coupled with the processor 120 and store data necessary of the various embodiments of the disclosure. The memory 150 may be implemented in the form of a memory embedded in the electronic apparatus 100' according to a data storage use, or implemented in the form of a memory attachable to or detachable from the electronic apparatus 100'. For example, the data for the driving of the electronic apparatus 100' may be stored in a memory embedded to the electronic apparatus 100', and data for an expansion function of the electronic apparatus 100' may be stored in a memory attachable to or detachable from the electronic apparatus 100'. The memory embedded in the electronic apparatus 100' may be implemented as at least one from among a volatile memory (e.g., a dynamic RAM (DRAM), a static RAM (SRAM), a synchronous dynamic RAM (SDRAM), etc.), or a non-volatile memory (e.g., one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard disk drive (HDD) or a solid state drive (SSD)). In addition, the memory that is attachable to or detachable from the electronic apparatus 100' may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

According to an embodiment, the memory 150 may store a computer program that includes at least one instruction or instructions for controlling the electronic apparatus 100'.

According to an embodiment, the memory 150 may store an image (i.e., an input image), various data, information, and the like received from an external device (e.g., a source device), an external storage medium (e.g., USB), an external server (e.g., WEBHARD), and the like.

According to one or more embodiments, the memory 150 may be implemented as a single memory configured to store data generated from various operations according to the disclosure. However, according to other embodiments, the memory 150 may be implemented to include a plurality of memories configured to store data of different types, respectively, or store data generated from different steps, respectively.

Although the various data has been described as being stored in an external memory of the processor 120 in the above-described one or more embodiments, at least a portion from among the above-describe data may be stored in an internal memory of the processor 120 according to at least one embodiment from among the electronic apparatus 100' or the processor 120.

The power supply part 160 may be configured to supply power being input from an external power source by the control of the processor 120 to internal elements 110, 130, 140, 150, 170, 180, and 190.

The sensor 170 may include sensors of various types such as, for example, and without limitation, a voice recognition sensor, a motion recognition sensor, a proximity sensor, a touch sensor, a position sensor, a microphone, and the like. According to an embodiment, the voice recognition sensor may recognize a user voice for executing the peripheral device control function. According to an embodiment, the motion recognition sensor may recognize a user gesture for executing the peripheral device control function.

The camera 180 may be turned on according to a pre-set event and may perform capturing. The camera 180 may convert a captured image to an electric signal and generate image data based on the converted signal. For example, a subject may be converted to an electric image signal through a semiconductor charged coupled device (CCD), and the image signal converted as described may be signal processed after being amplified and converted to a digital signal.

The speaker 190 may output a sound signal. For example, the speaker 190 may output a digital sound signal processed in the processor 120 by converting and amplifying to an analog sound signal. For example, the speaker 190 may include at least one speaker unit, a D/A converter, an audio amplifier, and the like capable of outputting at least one channel. According to an embodiment, the speaker 190 may be implemented to output various multi-channel sound signals. In this case, the processor 120 may control the speaker 190 to enhance process and output the input sound signal to correspond to an enhance processing of an input image.

The electronic apparatus 100' may additionally include a tuner and a demodulator according to one or embodiments. The tuner (not shown) may receive a radio frequency (RF) broadcast signal by tuning a channel selected by a user or all pre-stored channels from among the RF broadcast signals that are received through an antenna. The demodulator (not shown) may demodulate by receive a digital IF (DIF) signal converted in the tuner, and perform a channel decoding, and the like.

According to one or more embodiments, the electronic apparatus 100 may operate in not only a device off state in which power of a device is turned off, but also in a screen off state (or screen off mode) in which power of the device is not turned off, but only the display 110 (or screen) is turned off. For example, the device off state may be a state in which only a power button of the electronic apparatus 100 is inputtable and/or a state in which only a power button of the remote controller is inputtable and may be a state in which only a power on command may be receivable. Alternatively, the screen off state may be a state in which only the display 110 is turned off or some elements which include the display 110 are turned off That is, it may be a state in which some buttons other than the power button or all buttons of the electronic apparatus 100 are inputtable, and a state in which a voice input, a gesture input, and the like are also possible. A screen turn off state (herein, screen off state) may include various states in which the screen is identified as having been turned off such as a state in which power is not supplied to the display 110 and a state in which a black screen is provided to the display 110.

Figure 2C:
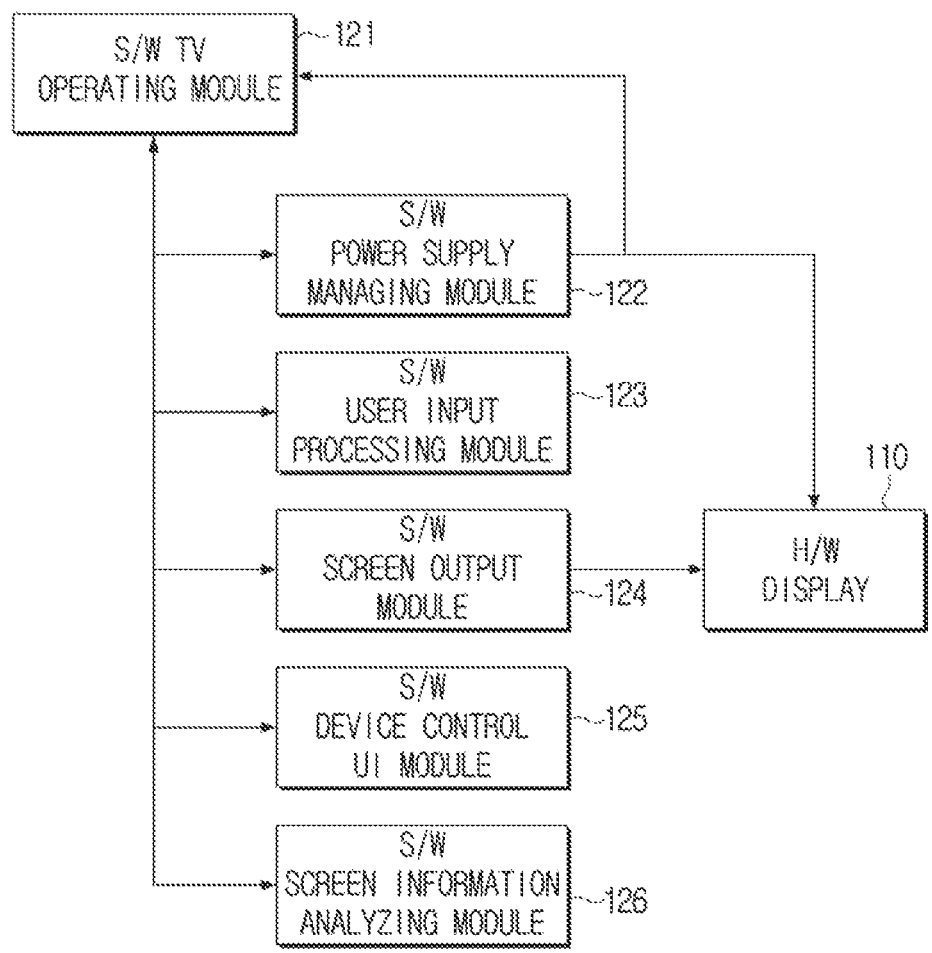
FIG. 2C is a diagram illustrating a screen off state according to one or more embodiments.

FIG. 2C is a diagram illustrating a screen off state according to one or more embodiments.

Referring to FIG. 2C, the processor 120 may control an operation of the electronic apparatus 100 by using various software that includes a device operating module 121, a power supply managing module 122, a user input processing module 123, a screen output module 124, a device control module 125, and a screen information analyzing module 126.

According to an embodiment, the processor 120 may control, through power supply management using the power supply managing module 122, the display 110 such that the device operating module 121 is normally and conventionally operated, but the screen is configured to maintain the turned off state in the screen off state. According to an embodiment, if the screen off state is a state in which a black screen is provided to the display 110, the processor 120 may provide the black screen to the display 110 using the screen output module 124. In some cases, it may be possible to identify whether it is in a state in which the black screen is being provided to the display 110 by using the screen information analyzing module 126. In the screen off state, it may be in a state in which receiving and/or processing a user command such as, for example, and without limitation, a remote controller signal, a user voice, a user gesture, and the like is possible through the user input processing module 123.

Figure 3:
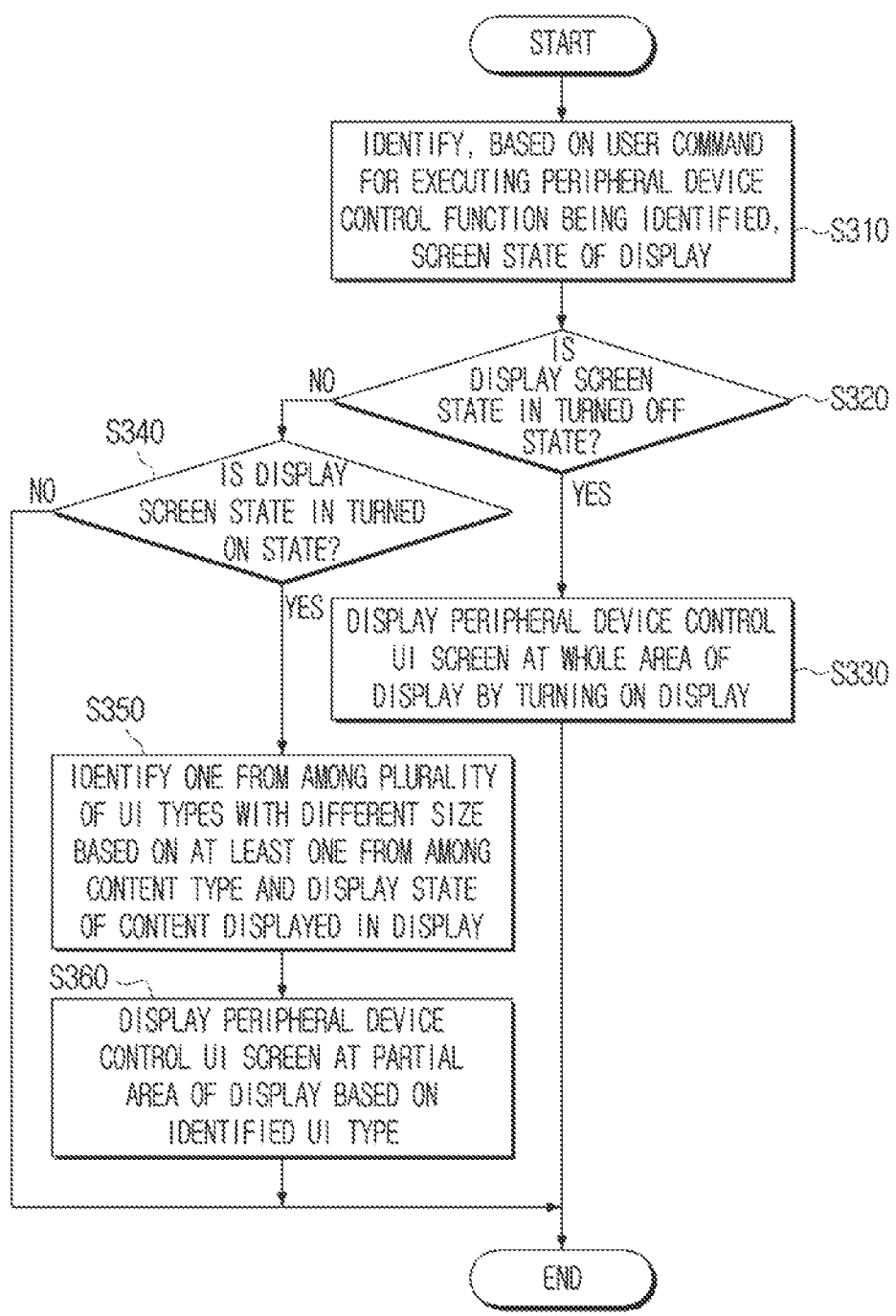
FIG. 3 is a diagram illustrating an operation of an electronic apparatus according to one or more embodiments.

FIG. 3 is a diagram illustrating an operation of an electronic apparatus according to one or more embodiments.

Referring to FIG. 3, at operation S310, the processor 120 may identify, based on a user command for executing the peripheral device control function being identified, a screen state (or screen mode) of the display 110. Here, the user command may be input in various forms such as a remote controller signal, a user voice, a user gesture, and the like. Here, the screen state of the display 110 may include a screen turn on state or a screen turn off state.

At operation S320, the processor 120 may identify whether a screen of the display 110 is in a screen off state. Based on the display 110 being identified as in the screen off state, at operation S330, the processor 120 may display a UI (hereinafter, a control UI) corresponding to the peripheral device control function at a whole area of the display 110 by turning on the display 110. Here, the turning on may include various states which can be identified as the screen being turned on such as a state in which power is supplied to the display 110, and a state in which the black screen is not provided and an image is provided to the display 110.

Based on the display 110 being identified as not in the screen off state, at operation S340, the processor 120 may identify whether the display 110 is in the screen turned on state (hereinafter, screen on state). Based on the display 110 being identified as in the screen on state, at operation S350, the processor 120 may identify one from among a plurality of UI types based on a type of at least one content and a display state of at least one content displayed in the display 110. Here, the plurality of UI types may be UIs of different sizes. The plurality of UI types may be such that control information included according to the sizes being different also varies, but is not necessarily limited thereto.

At operation S360, the processor 120 may display the control UI at a partial area of the display 110 based on the identified UI type from among the plurality of UI types. That is, the processor 120 may display a peripheral device control UI in only the partial area and not the whole area of the display 110.

Figure 4A:
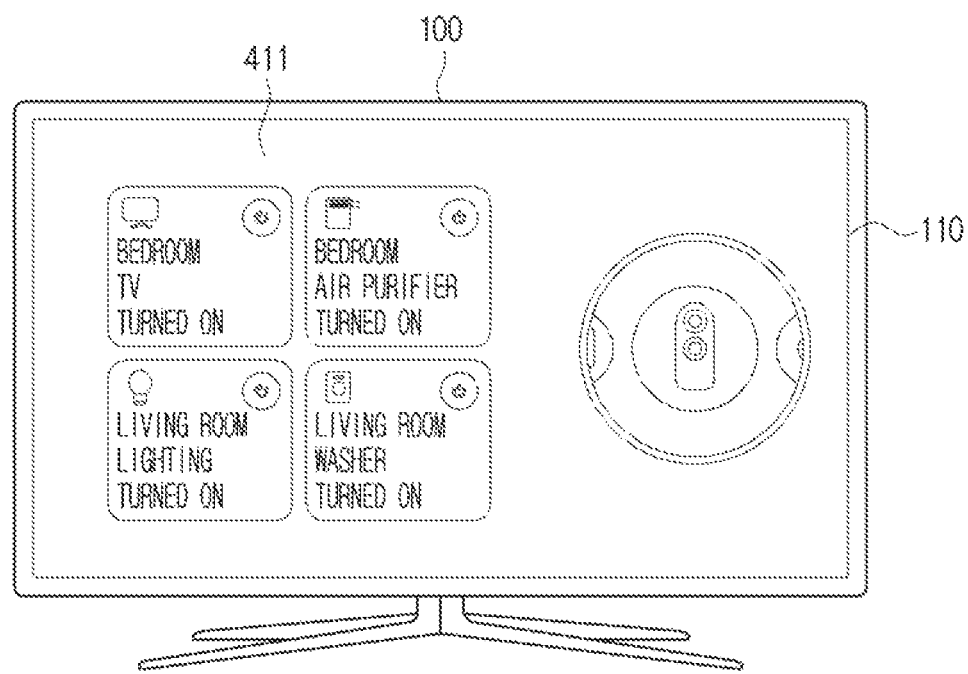
FIGS. 4A, 4B, and 4C are diagrams illustrating UI types according to one or more embodiments.
Figure 4B:
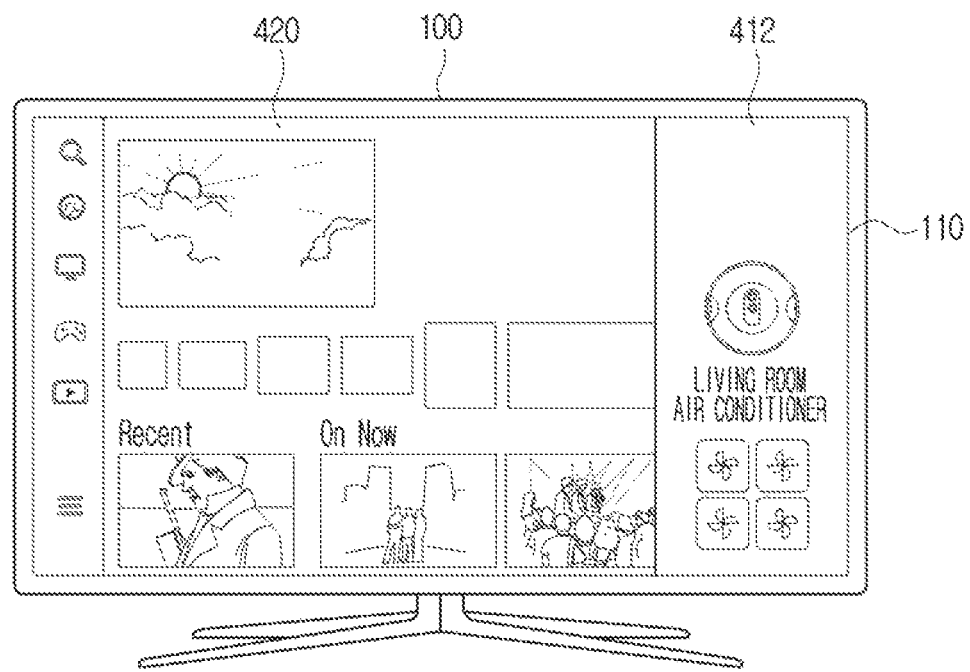
Figure 4C:
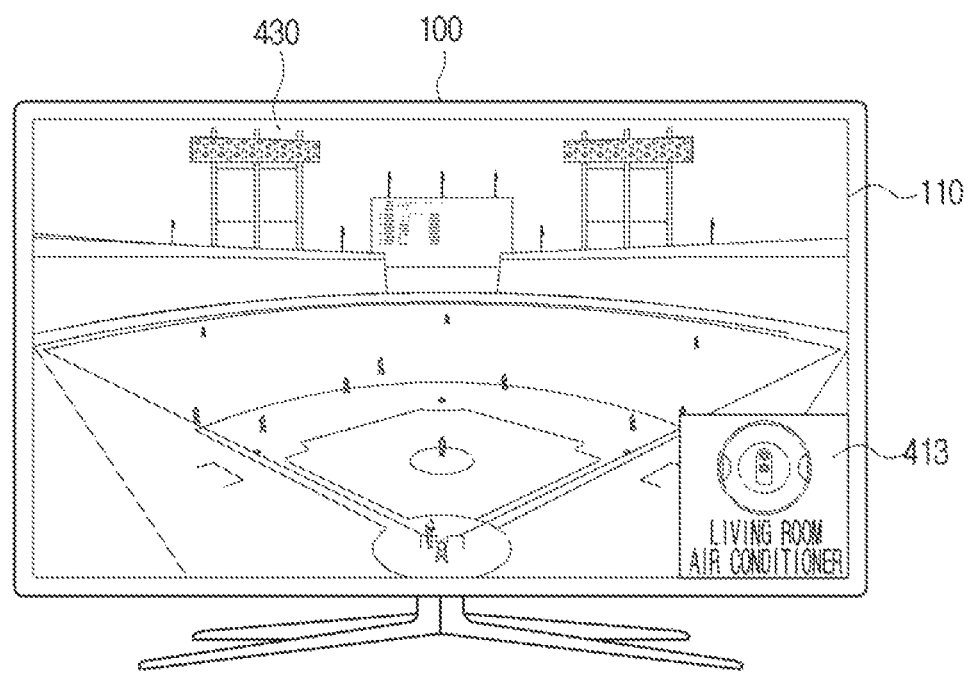

FIGS. 4A, 4B, and 4C are diagrams illustrating UI types according to one or more embodiments.

FIG. 4A shows a control UI 411 as an example of a control UI being displayed at the whole area of the display 110 according to an embodiment.

FIG. 4B and FIG. 4C show control UI 412 and control UI 413, respectively, as examples of a control UI being displayed at a partial area of the display 110 according to an embodiment. For example, a size of a control UI 412 shown in FIG. 4B may be greater than a size of a control UI 413 shown in FIG. 4C.

Referring to FIGS. 4A-4C, content of the control information included in each of the control UIs 411, 412, and 413 according to the sizes of the control UIs 411, 412, and 413 may also vary. For example, the control UI 413 shown in FIG. 4C may include control information of relatively the smallest amount, the control UI 411 shown in FIG. 4A may include relatively the largest control information, and the control UI 412 shown in FIG. 4B may include control information of a medium amount. For example, the control UI 413 shown in FIG. 4C may include first control information, the control UI 412 shown in FIG. 4B may include first control information and second control information, and the control UI 411 shown in FIG. 4A may include first control information, second control information, and third control information. According to an embodiment, the first control information may include a device selection menu and/or a basic control function, the second control information may include a detailed control function, and the third control information may include additional information associated with a device. For example, the additional information may include a smart things map view, an energy use status within a household, weather information, recent control device information, and the like, but is not limited thereto.

Figure 5:
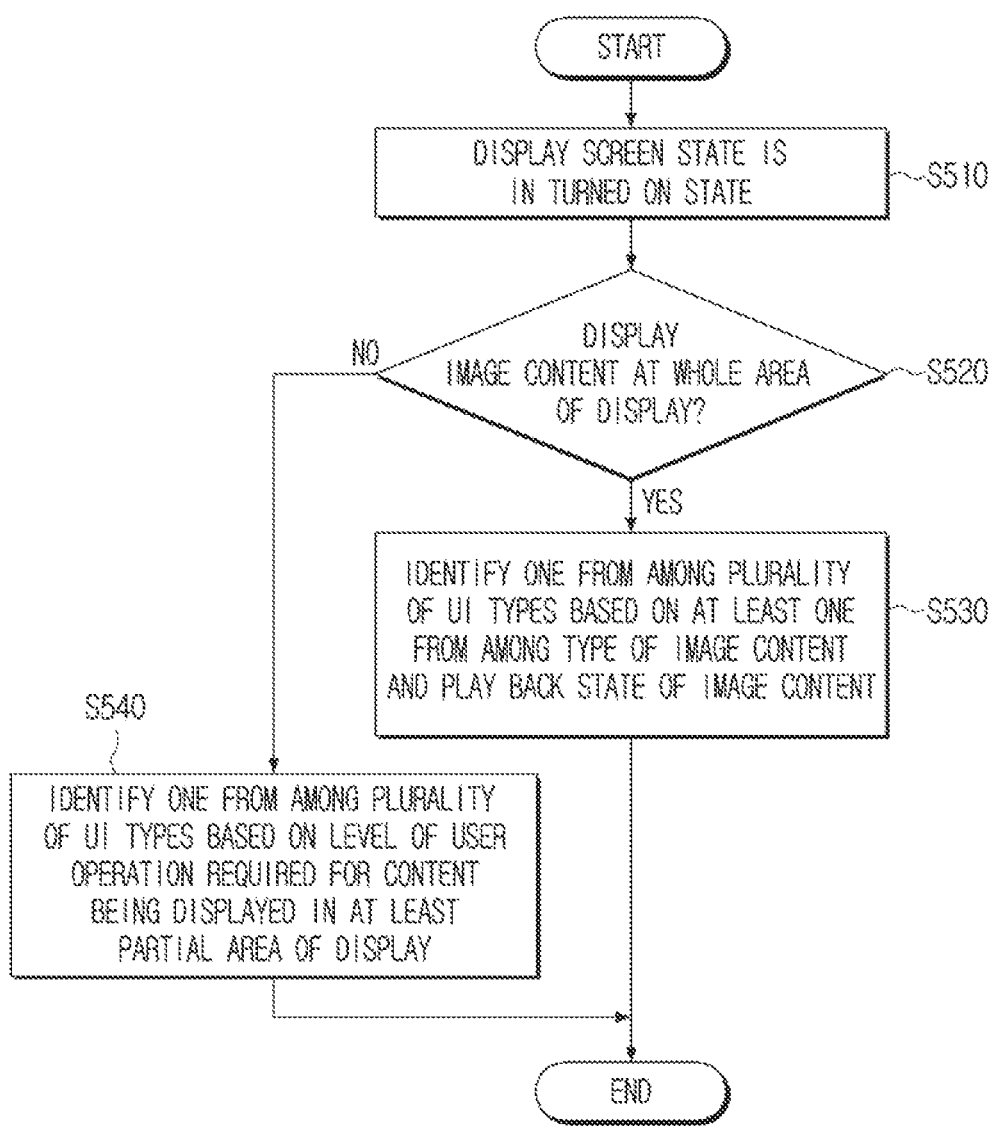
FIG. 5 is a diagram illustrating a UI type identifying method according to one or more embodiments.

FIG. 5 is a diagram illustrating a UI type identifying method according to one or more embodiments.

Referring to FIG. 5, at operation S510, the processor 120 may identify whether a screen state of the display 110 is in a turned on state. Based on the screen state of the display 110 being in the turned on state, at operation S520, the processor 120 may identify whether an image content is displayed at the whole area of the display 110.

Based on the image content being identified as displayed at the whole area of the display 110, at operation S530, the processor 120 may identify one from among the plurality of UI types based on at least one from among a type of the image content or a playback state of the image content. For example, the processor 120 may identify, based on one image content being provided in full screen of the display 110, one from among the plurality of UI types based on at least one from among the type of the image content or the playback state of the image content of the corresponding image content. Here, the type of the image content may be a selected image by the user, an advertisement image, an automatic playback image, and the like. The playback state of the image content may include an image stopped state, a loading state, a playback rate, and the like.

Based on the image content being identified as not displayed at the whole area of the display 110, at operation S540, the processor 120 may identify one from among the plurality of UI types based on a level of user operation required for content that is displayed in at least a partial area of the display 110. Here, the image content not being displayed at the whole area of the display 110 may include not only an example of other content that is not the image content (e.g., a menu content) being displayed at the whole area of the display 110, but also various multi-view situations. For example, various examples such as an example of the image content being displayed at only a partial area of the display 110, an example of the image content being displayed at the partial area of the display 110 and other image content being displayed at the remaining area, and an example of the image content being displayed at the partial area of the display 110 and the menu content being displayed at the remaining area may be included. The level of user operation required may refer to whether a display content is content that requires a user input to some degree. For example, a PC screen content, an application (APP) home screen, a YOUTUBE initial screen, and the like may be content with a relatively high level of user operation required. Alternatively, content in which user operation is not possible such as, for example, and without limitation, an image content being played back, an advertisement content, and the like may be content with a low level of user operation required.

Figure 6:
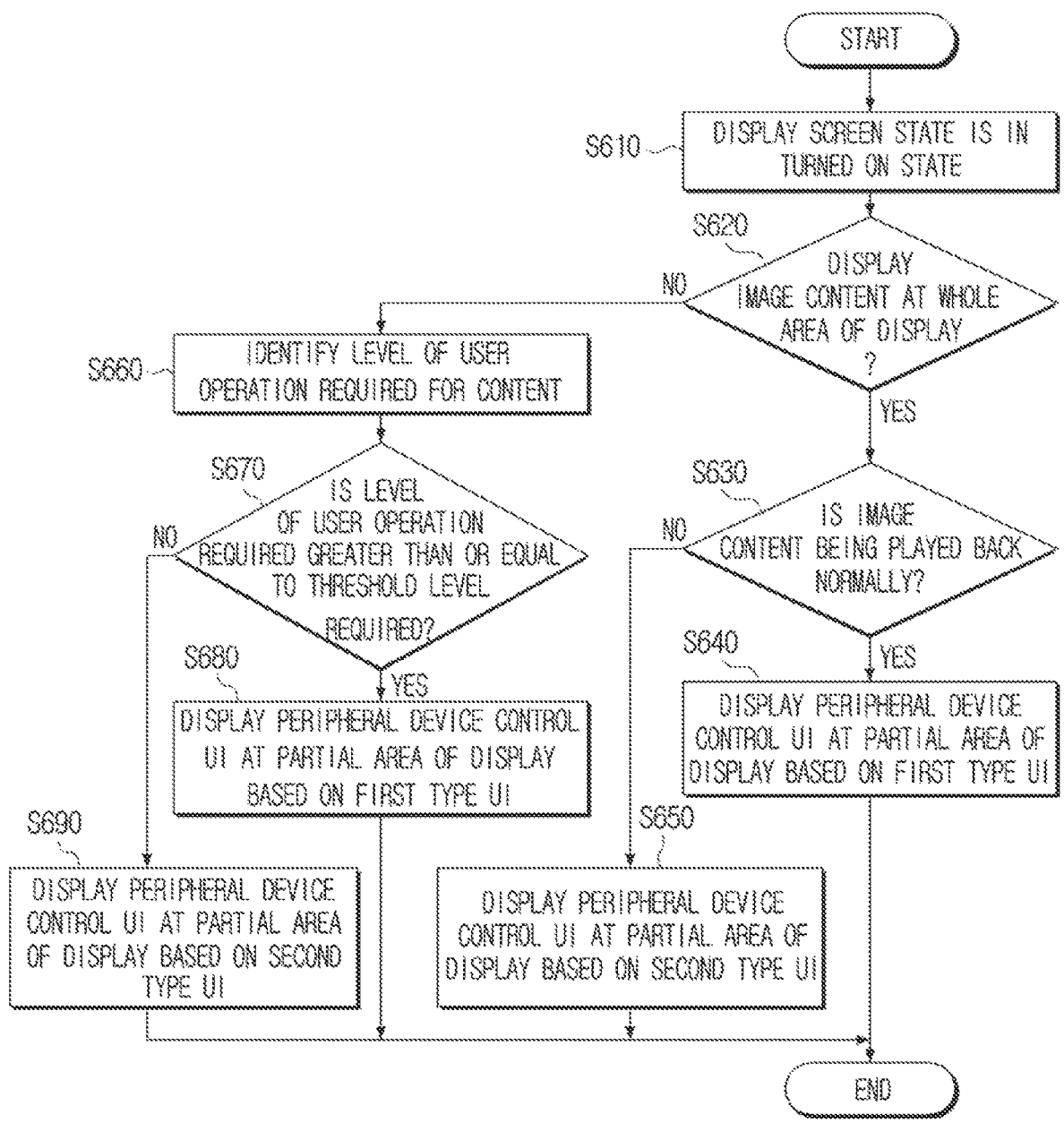
FIG. 6 is a diagram illustrating in detail a UI type identifying method according to one or more embodiments.

FIG. 6 is a diagram illustrating in detail a UI type identifying method according to one or more embodiments.

Referring to FIG. 6, at operation S610, the processor 120 may identify whether the screen state of the display 110 is in the turned on state. Based on the screen state of the display 110 being in the turned on state, at operation S620, the processor 120 may identify whether the image content is displayed at the whole area of the display 110.

Based on the image content being identified as displayed at the whole area of the display 110, at operation S630, the processor may identify whether the image content is being played back normally.

Based on the image content being identified as being played back normally, at operation S640, the processor 120 may display a device control UI at a partial area of the display 110 based on a first type UI. Based on the image content being identified as not being played back normally, at operation S650, the processor 120 may display a device control UI at a partial area of the display 110 based on a second type UI. Here, a size of the second type UI may be relatively greater than a size of the first type UI.

Based on the image content being identified as not displayed at the whole area of the display 110, in operation S660, the processor 120 may identify the level of user operation required for content that is displayed in at least the partial area of the display 110.

At operation S670, the processor 120 may identify whether the level of user operation required is greater than or equal to a threshold level required. Based on the level of user operation required being greater than or equal to the threshold level required, at operation S680, the processor 120 may display a device control UI at a partial area of the display based on the first type UI. Based on the level of user operation required being less than the threshold level required, at operation S690, the processor 120 may display a device control UI at a partial area of the display based on the second type UI. Here, the size of the second type UI may be relatively greater than the size of the first type UI. According to an embodiment, the level of user operation required may be identified based on a type of a plurality of content, a display size of the plurality of content, a display position, and the like that are provided to a multi-view screen. For example, the processor 120 may calculate a level of operation required by applying different weight values to types of content, display sizes of the content, display positions, and the like. Accordingly, the threshold level required may be a value to which the level required is converted to a numerical value, but is not limited thereto. For example, a first UI or a second UI may be mapped for each content type. For example, the first UI or the second UI may be mapped for each content type and display size. For example, the first UI or the second UI may be mapped for each content type, display size, and display position.

FIGS. 7A-7D are diagrams illustrating a device control UI providing method for when content is provided in full screen according to one or more embodiments. Referring to FIGS. 7A-7D, according to an embodiment, the processor 120 may provide device control UIs of different types based on the type of content provided in full screen.

Figure 7A:
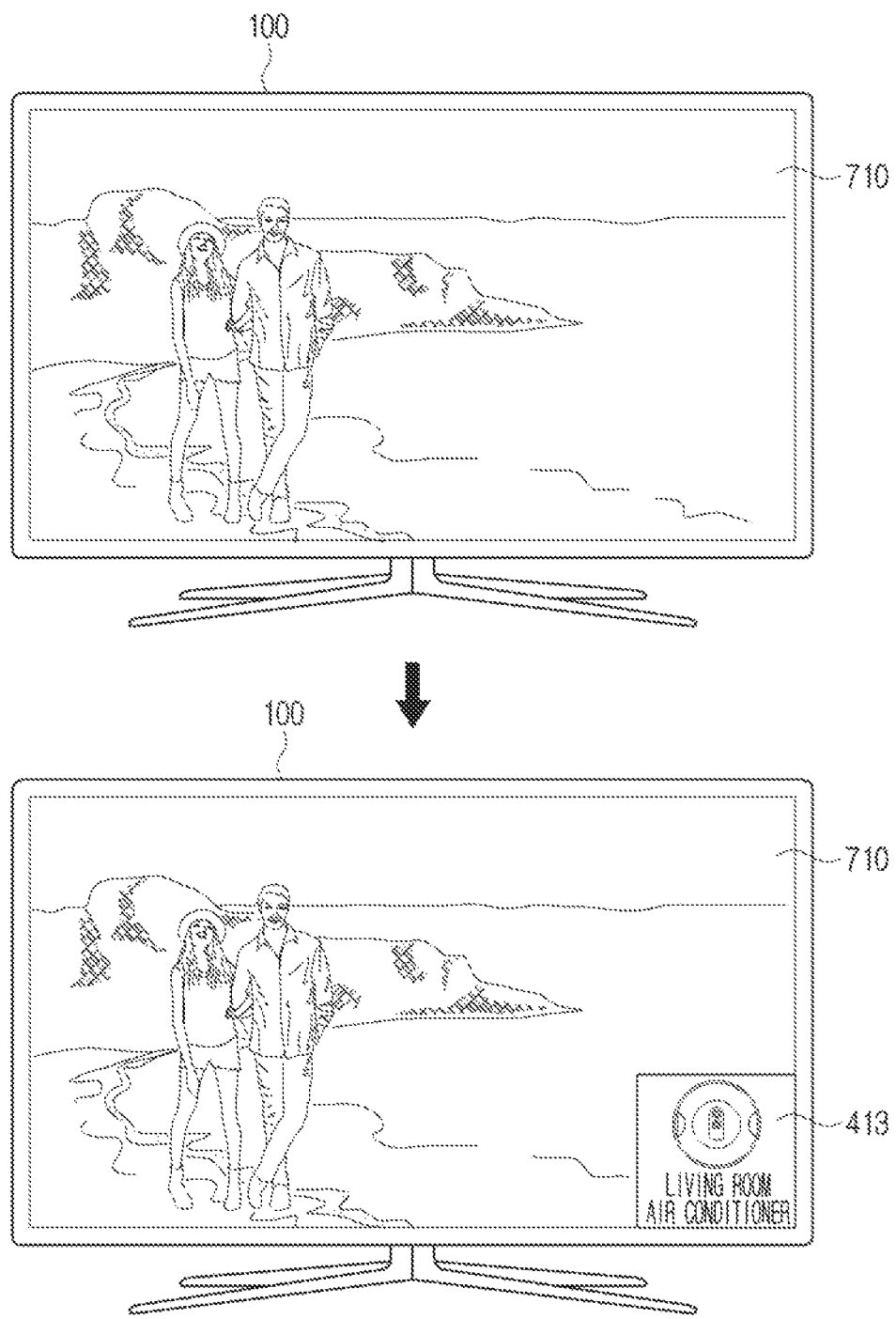
FIGS. 7A-7D are diagrams illustrating a device control UI providing method for when content is provided in full screen according to one or more embodiments.

As shown in FIG. 7A, according to an embodiment, if a live broadcast image 710 is provided in full screen, the processor 120 may provide the control UI 413 (FIG. 4) at a partial area of the screen based on the first type UI. That is, the first type UI may provide a prompt device control function to the UI that covers the screen to a minimum. For example, the first type UI may include different control information according to a user command that corresponds to the peripheral device control function. For example, the most basic device control menu may be included, but is not limited thereto.

According to an embodiment, if a user command first identified while the live broadcast image 710 is being provided in full screen is a command that does not include a device type, a first type UI including only device identification information may be provided. According to an embodiment, if the user command first identified while the live broadcast image 710 is being provided in full screen is a command that includes the device type, a menu for the most basic device control function such as, for example, and without limitation, turning on/off the corresponding device, stopping device operation, and the like may be included.

Figure 7B:
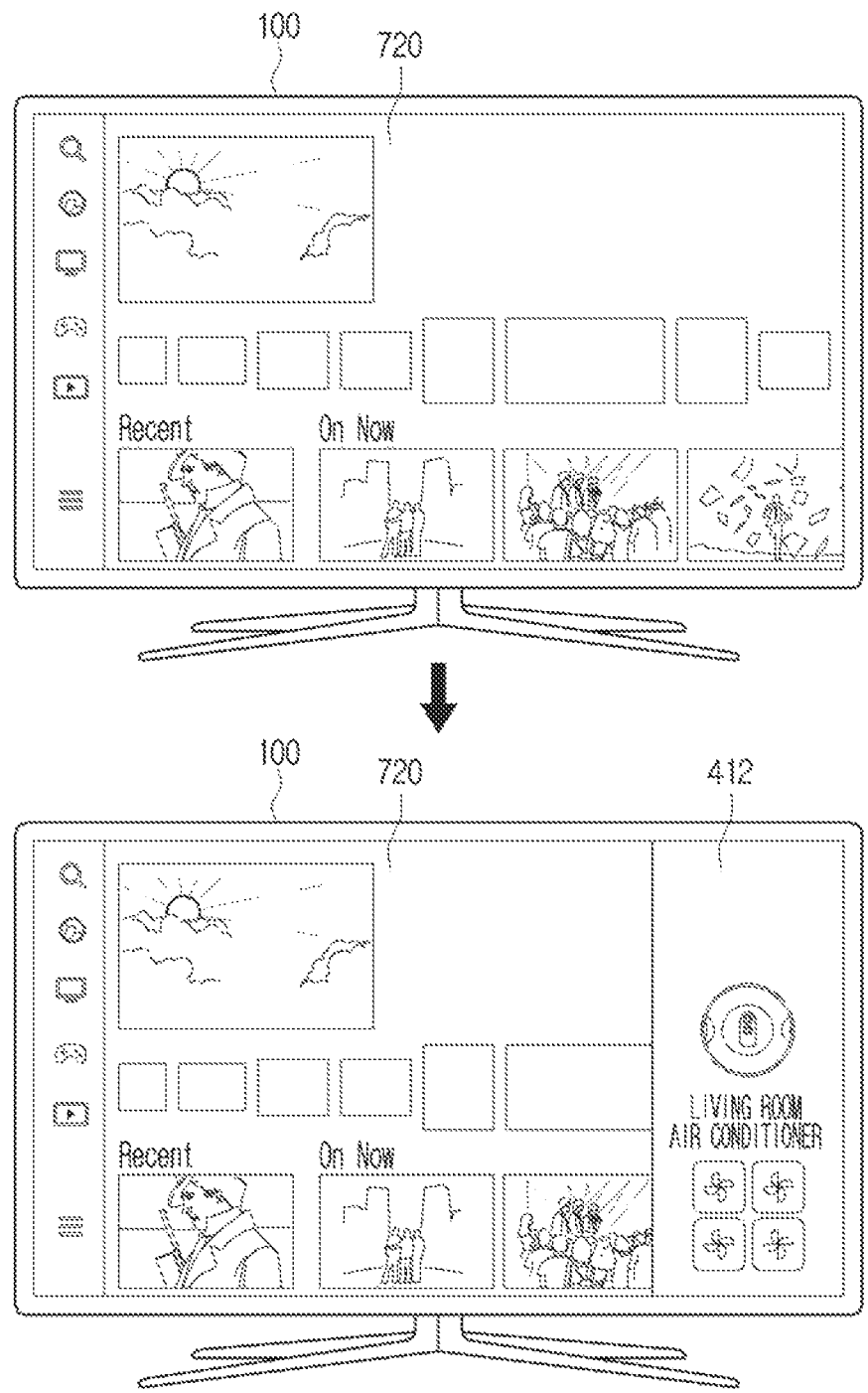

As shown in FIG. 7B, according to an embodiment, if a menu screen (e.g., TV home menu screen) 720 is provided in full screen, the processor 120 may provide the device control UI 412 at a partial area of the screen based on the second type UI. This is because, the live broadcast image 710 may be hindered in viewing by the user with respect to an image that is provided at a present time point if a large part thereof is covered, but a menu screen 720 is a screen that is operable as sufficiently desired by the user even after when it is no longer the present time point. In this case, the second type UI may be a UI that covers the screen of a relatively wide area than the first type UI and may provide a sufficient device control function. For example, the second type UI may include control information more detailed than the first type UI. For example, if the first type UI includes only a device control menu of a first priority, the second type UI may include device control menus of a first priority and a second priority.

According to an embodiment, if a user command first identified while the menu screen 720 is being provided in full screen is a command that does not include the device type, the second type UI including device identification information and a detailed operation of the device (e.g., turning on/off, stopping device operation, controlling temperature, etc.) may be provided. According to an embodiment, if the user command first identified while the menu screen 720 is being provided in full screen is a command that includes the device type (e.g., air conditioner), a menu for not only turning on/off the corresponding device, but also the most detailed device control functions such as, for example, and without limitation, selecting a mode, controlling temperature, and the like may be included.

However, the above-described example of the control information is merely one example, and may be applicable without limitation so long as the second type UI includes control information that is relatively detailed than the first type UI.

Figure 7C:
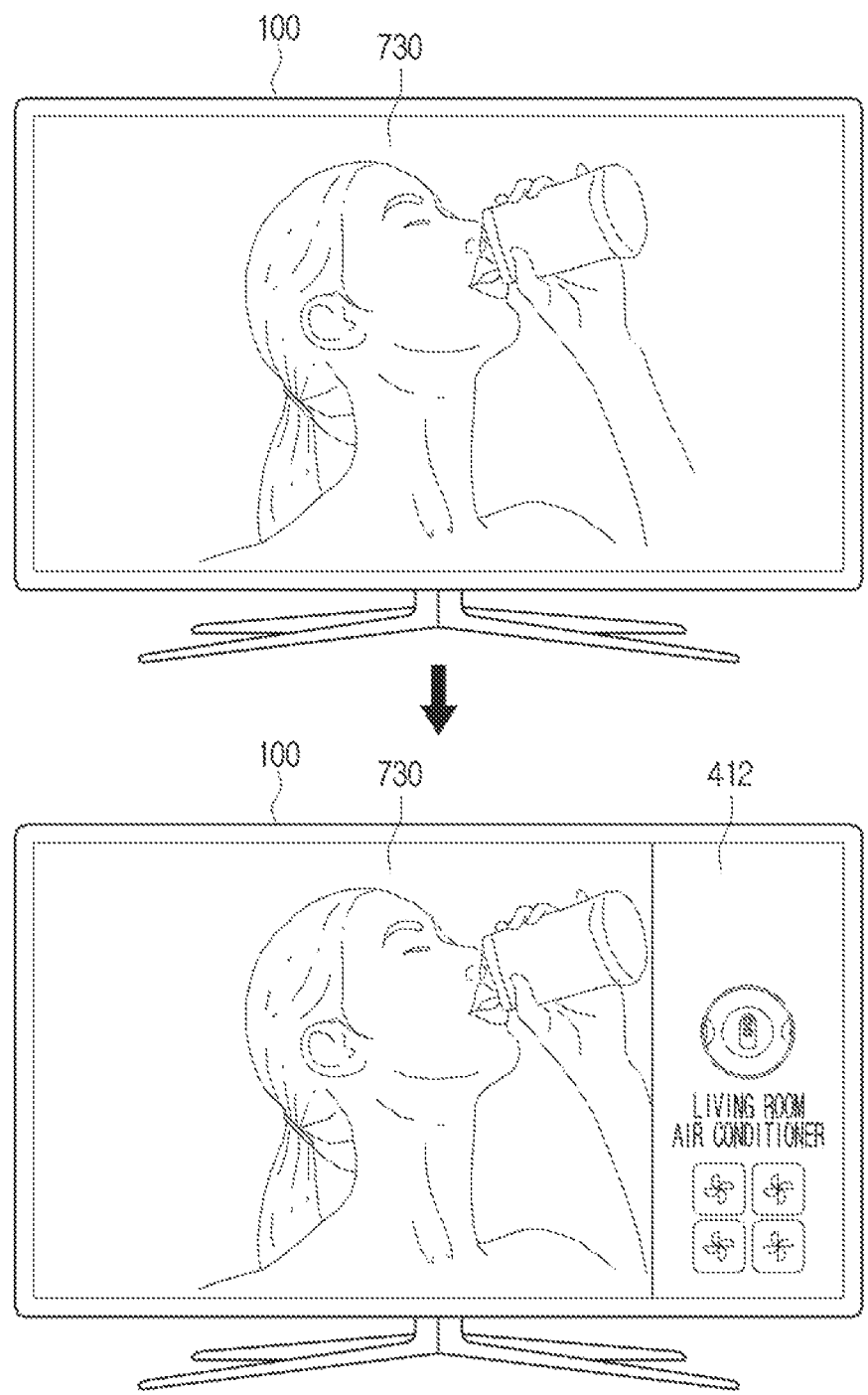

As shown in FIG. 7C, according to an embodiment, if an advertisement content 730 is provided in full screen, the processor 120 may provide the device control UI 412 at a partial area of the screen based on the second type UI. In this case, the second type UI may be a UI that covers the screen of a relatively wide area than the first type UI, and may provide a sufficient device control function. Because the advertisement content 730 is not content that is viewed desired by the user, there is not much difference even if a large part of the screen is covered due to device control having priority over viewing of the advertisement content.

Figure 7D:
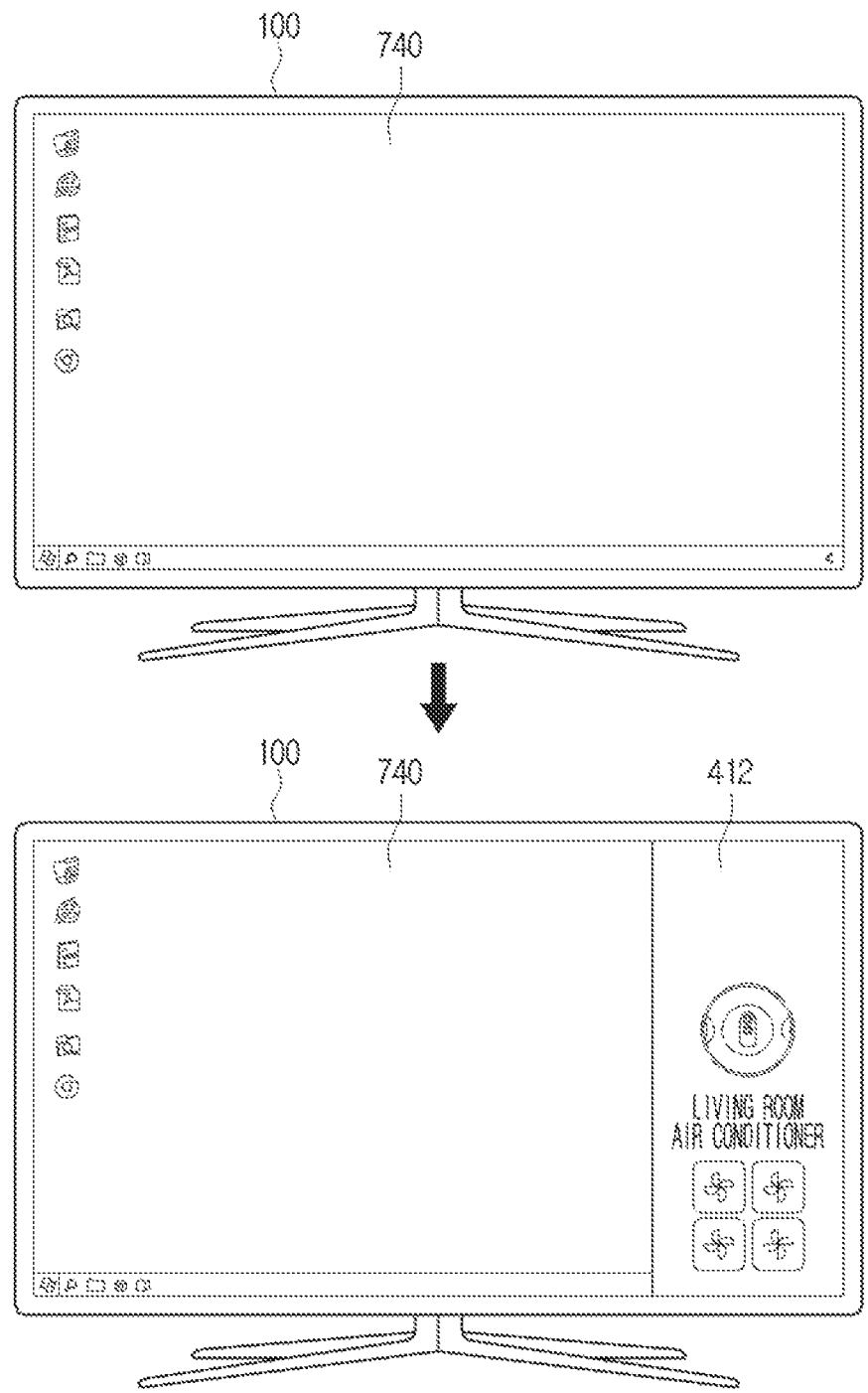

As shown in FIG. 7D, according to an embodiment, if a PC screen content 740 is provided in full screen, the processor 120 may provide the device control UI 412 at a partial area of the screen based on the second type UI. In this case, the second type UI may be a UI that covers the screen of a relatively wide area than the first type UI and may provide a sufficient device control function. This is because the PC screen content 740 is a screen that is operable as sufficiently desired by the user even after when it is no longer the present time point.

Figure 8A:
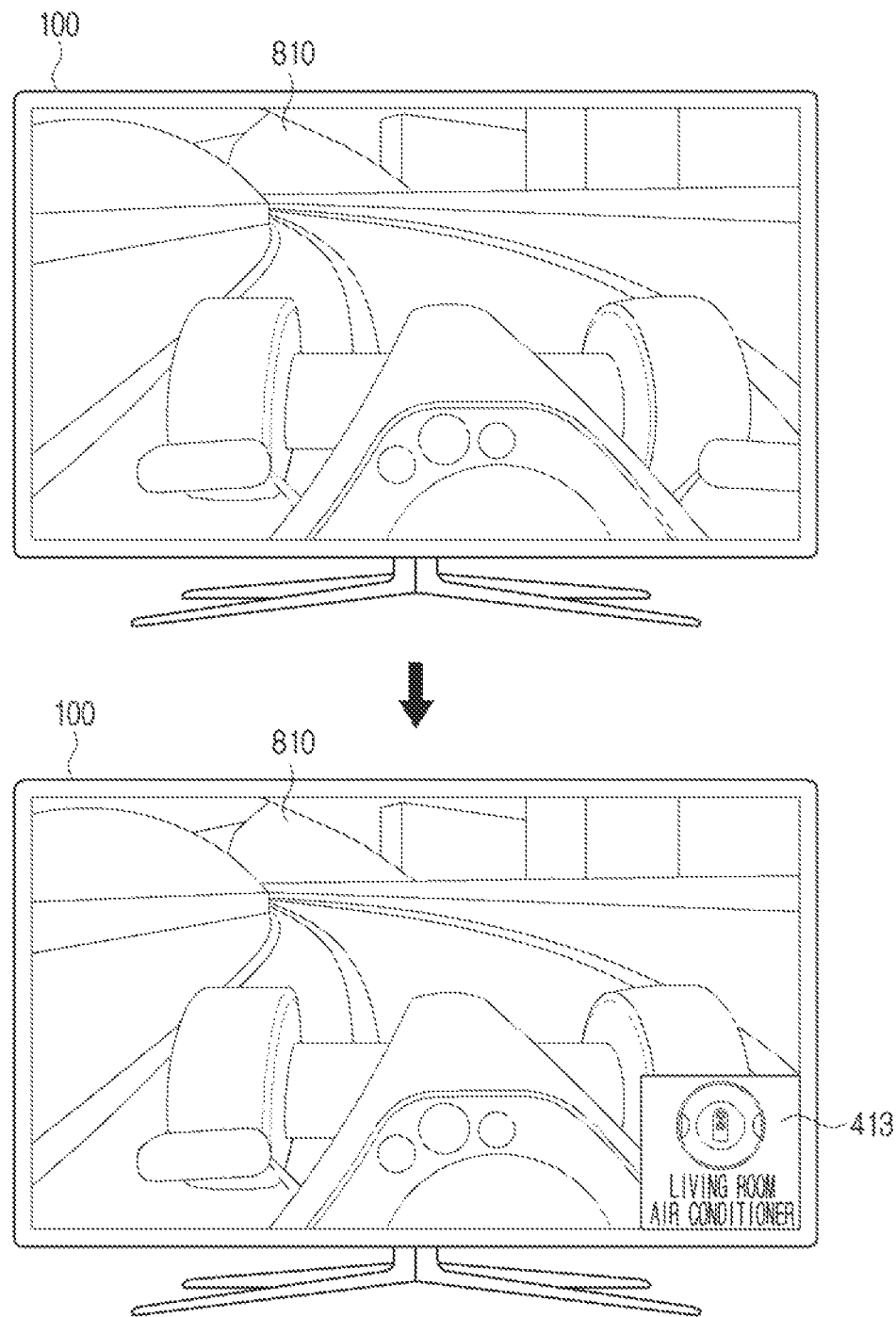
FIGS. 8A and 8B are diagrams illustrating a device control UI providing method for when content is provided in full screen according to one or more embodiments.
Figure 8B:
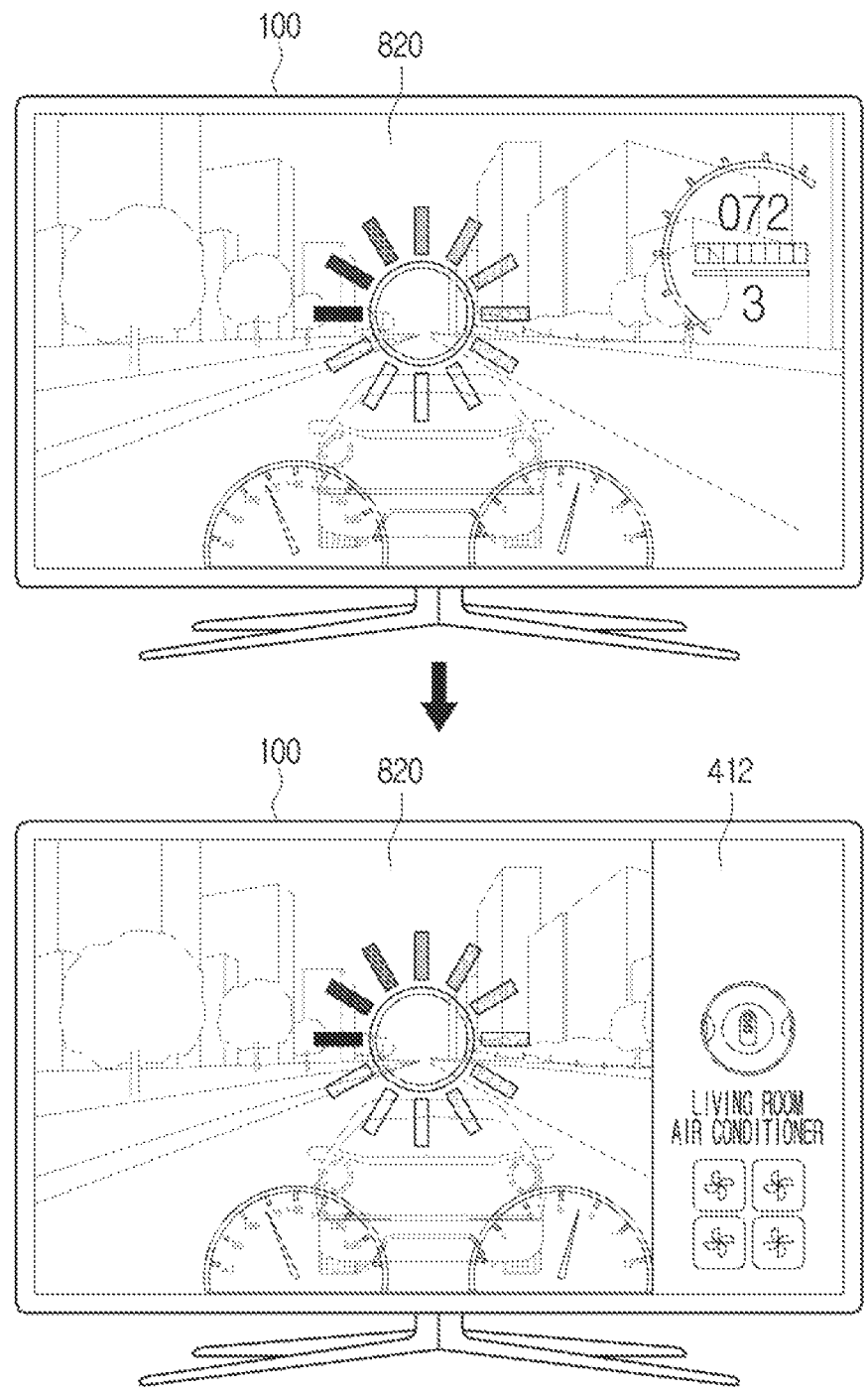

FIGS. 8A and 8B are diagrams illustrating a device control UI providing method for when content is provided in full screen according to one or more embodiments. Referring to FIGS. 8A and 8B, according to an embodiment, the processor 120 may provide device control UIs of different types based on the playback state of the content.

As shown in FIG. 8A, if a game image 810 is provided normally in full screen, the processor 120 may provide the device control UI 413 at a partial area of the screen based on the first type UI. That is, the first type UI may be a UI that covers the screen to a minimum and may provide a prompt device control function. This is because, if a large part of the game image is covered while the game image is being provided normally, it may hinder a game operation of the user.

As shown in FIG. 8B, if a game loading image 820 is provided in full screen, the processor 120 may provide the device control UI 412 at a partial area of the screen based on the second type UI. Even if the same game image is being provided as in FIG. 8A, there is not much difference even if a large part of the screen is covered due to the game image not being played back normally and is in loading.

If the content being played back other than the above is a VOD content, a device control UI may be provided based on the second type UI. This is because the user may adjust a playback time point if it is a VOD content. However, even if it is a VOD content, the first type UI may be provided in the playback state, and the device control UI may be provided at on the second type UI only when in a stopped state. This may be set/changed based on a user setting for the VOD content, preference information of the user for the corresponding content, and the like.

FIGS. 9A-9D are diagrams illustrating a device control UI providing method according to one or more embodiments.

Referring to FIGS. 9A-9D, the processor 120 may provide, based on an image content not being provided in full screen, a device control UI at a different area based on a priority of the content type being displayed in at least a partial area and/or a priority of the device control UI.

As shown in FIGS. 9A-9D, according to an embodiment, if a first content is displayed at a partial area of the screen and a second content is displayed at a remaining area, a device control UI may be provided at different areas based on the priority of a type of the first content and a type of the second content and/or the priority of a device control UI type. For example, the priority of the content type may be identified based on the level of user operation required for the content, a user preference, a user use history, and the like.

Figure 9A:
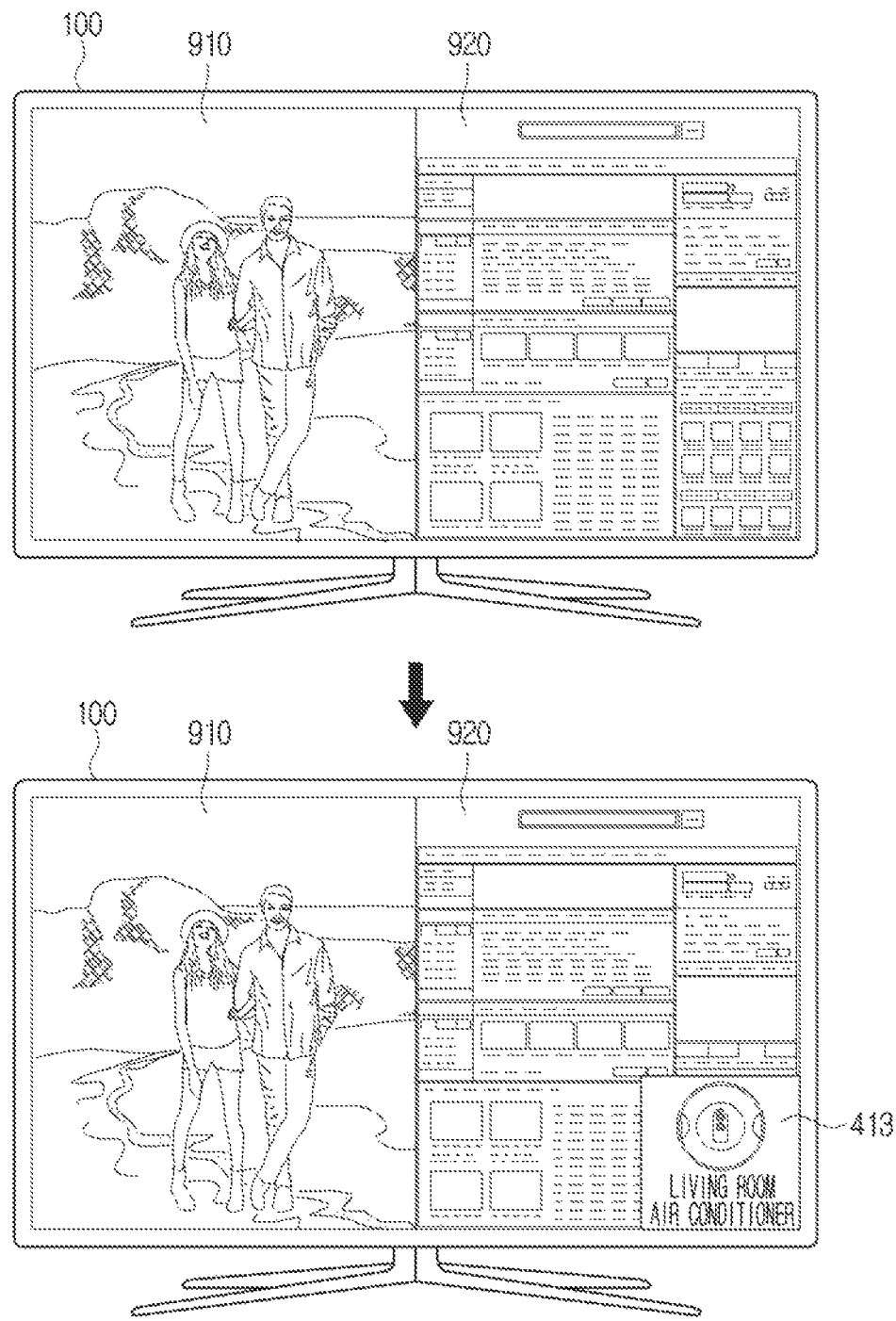
FIGS. 9A-9D are diagrams illustrating a device control UI providing method according to one or more embodiments.

As shown in FIG. 9A, according to an embodiment, if a user command for executing the peripheral device control function is identified while a broadcast content 910 is being provided at one area of the screen of the display 110 and an internet content 920 is being provided at the remaining area, the device control UI 413 may be provided at an area of the internet content 920 which is content of a low priority. For example, the internet content 920 may have a lower priority than the broadcast content 910 based on a level of disturbance to viewing.

Figure 9B:
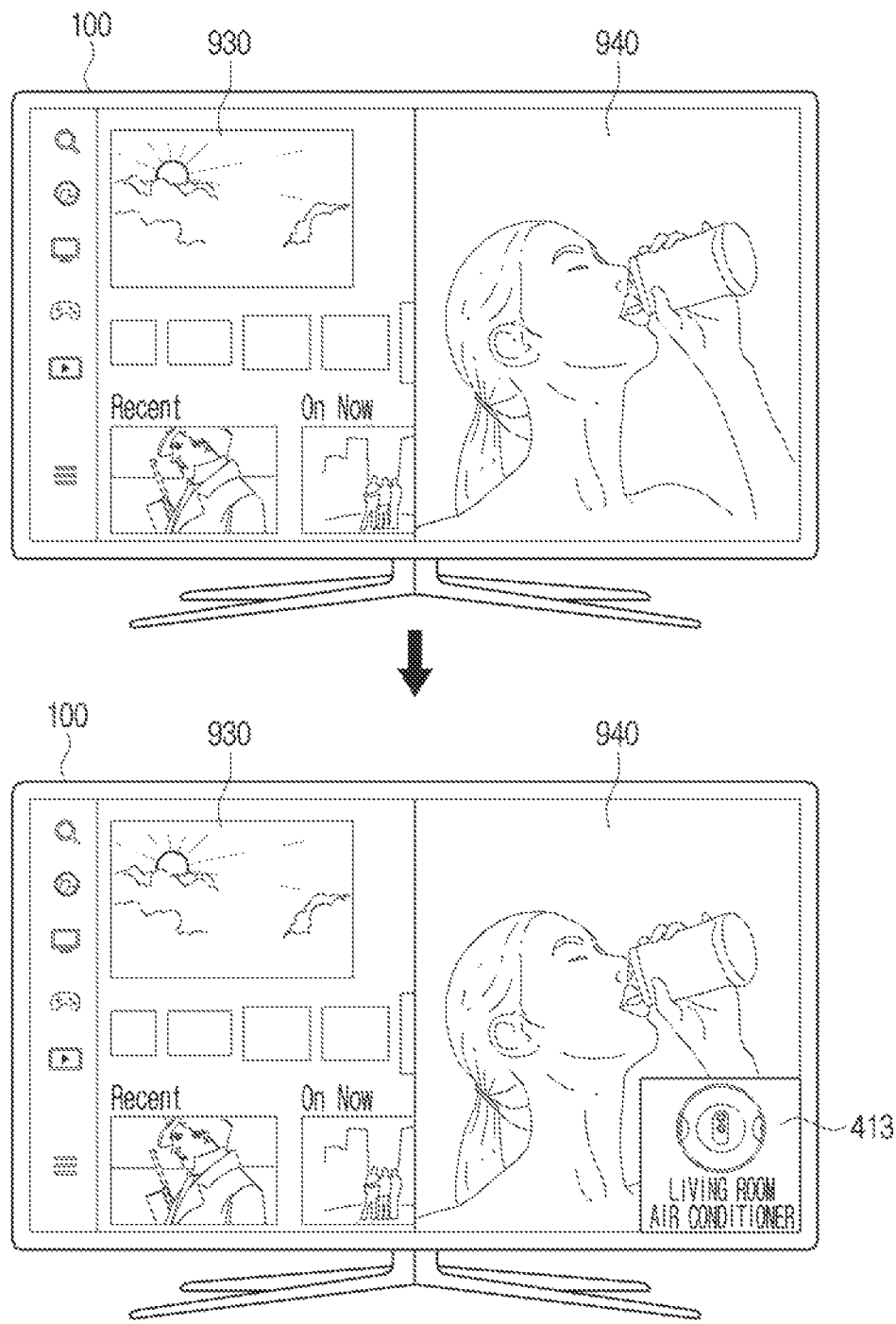

As shown in FIG. 9B, according to an embodiment, if a user command for executing the peripheral device control function is identified while a home screen content 930 (e.g., TV home screen, APP home screen, etc.) is being provided at one area of the screen of the display 110 and an advertisement content 940 is being provided at the remaining area, the device control UI 413 may be provided at the area of the advertisement content 940 which is content of a low priority.

For example, the advertisement content 940 may have a lower priority than the home screen content 930 based on the level of user operation required.

Figure 9C:
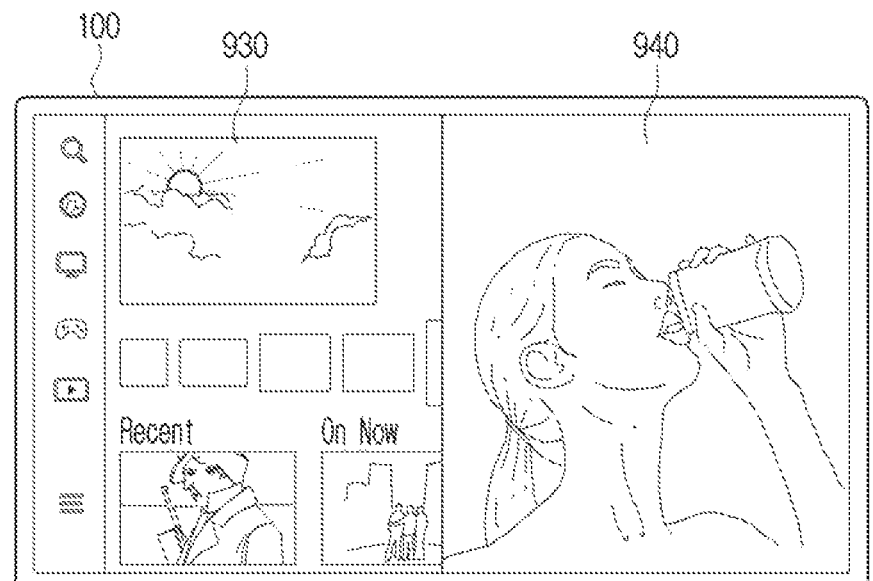
Figure 9C:
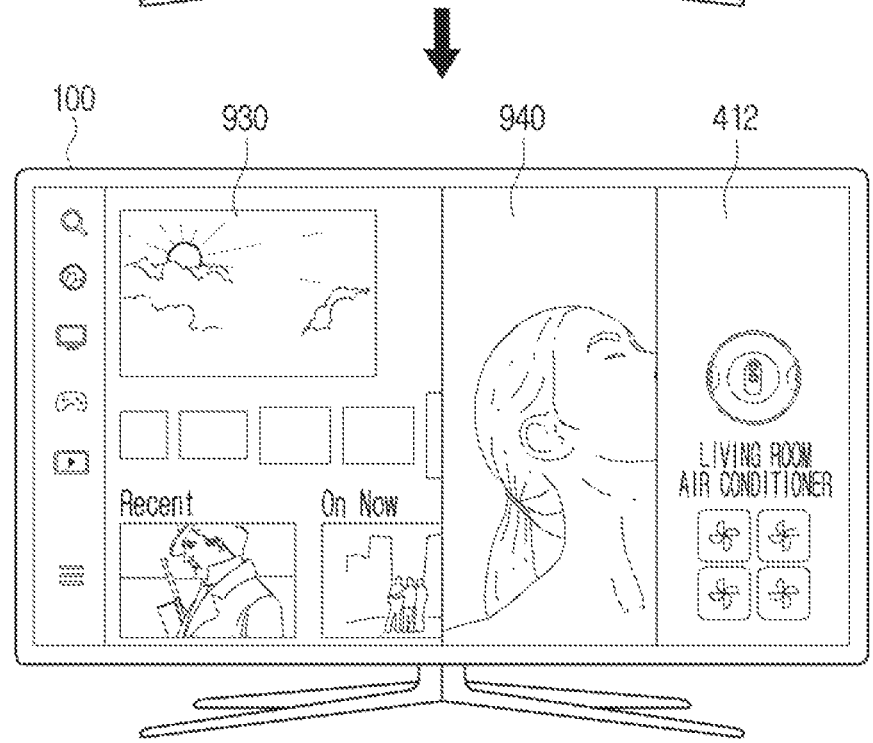

As shown in FIG. 9A and FIG. 9B, according to an embodiment, the type of the device control UI in the multi-view screen may be a first type UI 413. Because the multi-view screen is provided on a screen on which the plurality of content is divided, one content may be excessively covered when the second type UI is provided. However, the example is not limited thereto, and the second type UI may be provided according to the content type in even the multi-view screen. As shown in FIG. 9C, according to an embodiment, if it is a content of very low priority such as the advertisement content 940 when based on the level of user operation required, the level of viewing disturbance, and the like, a first type UI 413 may be provided in even the multi-view screen.

Figure 9D:
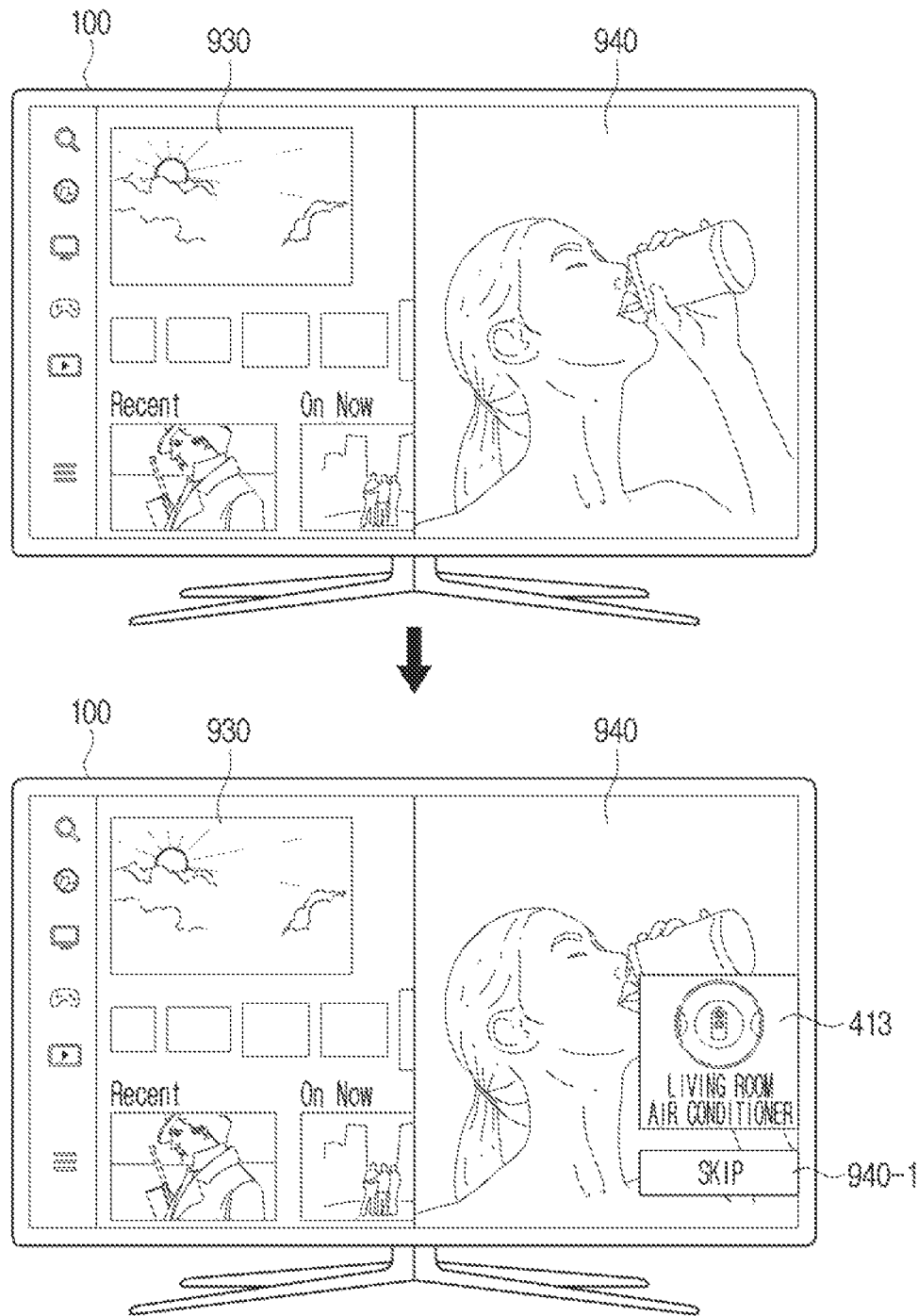

According to one or more embodiments, a position at which a device control UI is provided may be changed based on at least one from among the content type or the display state of the content displayed in the display 110. According to an embodiment, the position at which the device control UI is provided may be changed according to positions of objects within the content. As shown in FIG. 9D, according to an embodiment, if a menu 940-1 which requires a user operation is included within the advertisement content 940, the device control UI 413 may be provided avoiding the corresponding area.

FIG. 10 and FIGS. 11A, 11B, 11C are diagrams illustrating a device control UI providing method associated with a user selection according to one or more embodiments.

Figure 10:
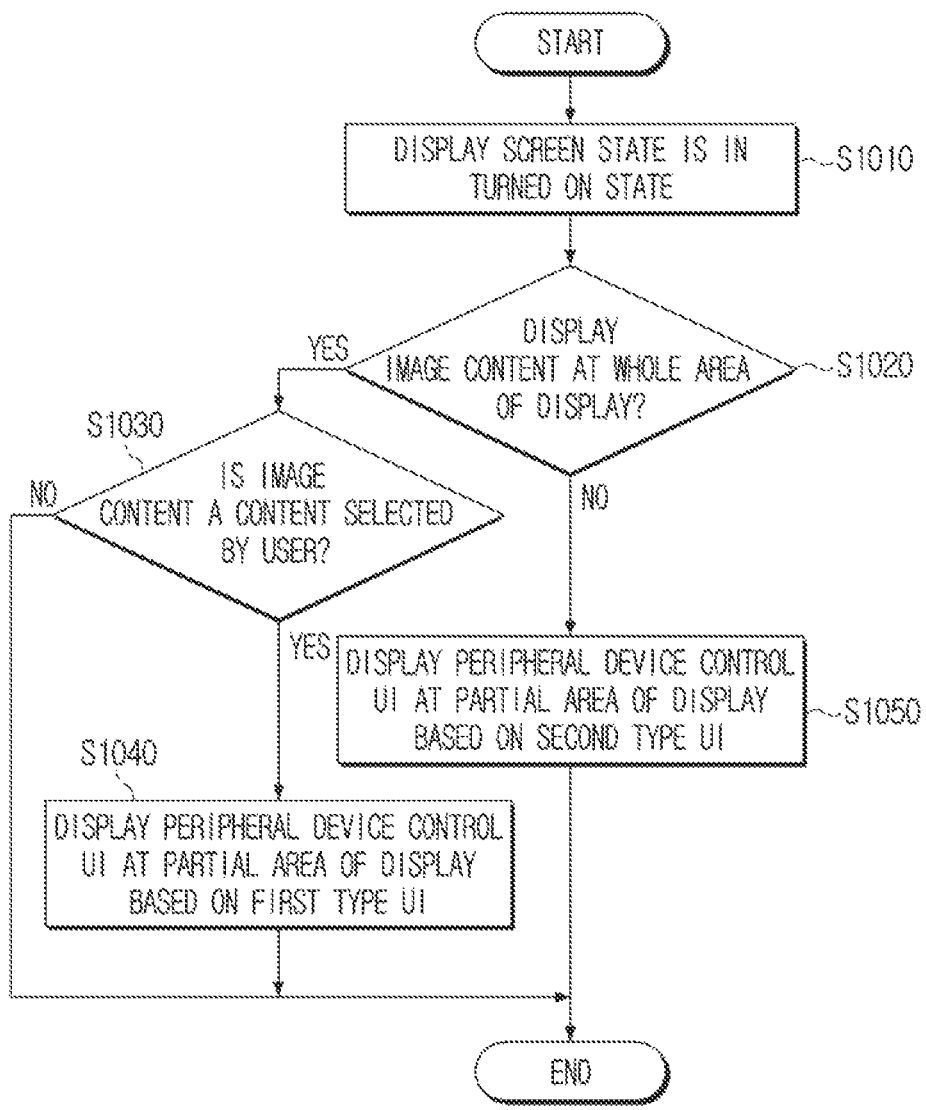
FIG. 10 and FIGS. 11A, 11B, 11C are diagrams illustrating a device control UI providing method associated with a user selection according to one or more embodiments.

Referring to FIG. 10, at operation S1010, the processor 120 may identify whether the screen state of the display 110 is in the turned on state. Based on the screen state of the display 110 being in the turned on state (S1010), at operation S1020, the processor 120 may identify whether an image content is displayed at the whole area of the display 110 (S1020).

Based on the image content being identified as displayed at the whole area of the display 110 (S1020:Y), at operation S1020, the processor 120 may identify whether the image content is content selected by the user (S1030).

Figure 11A:
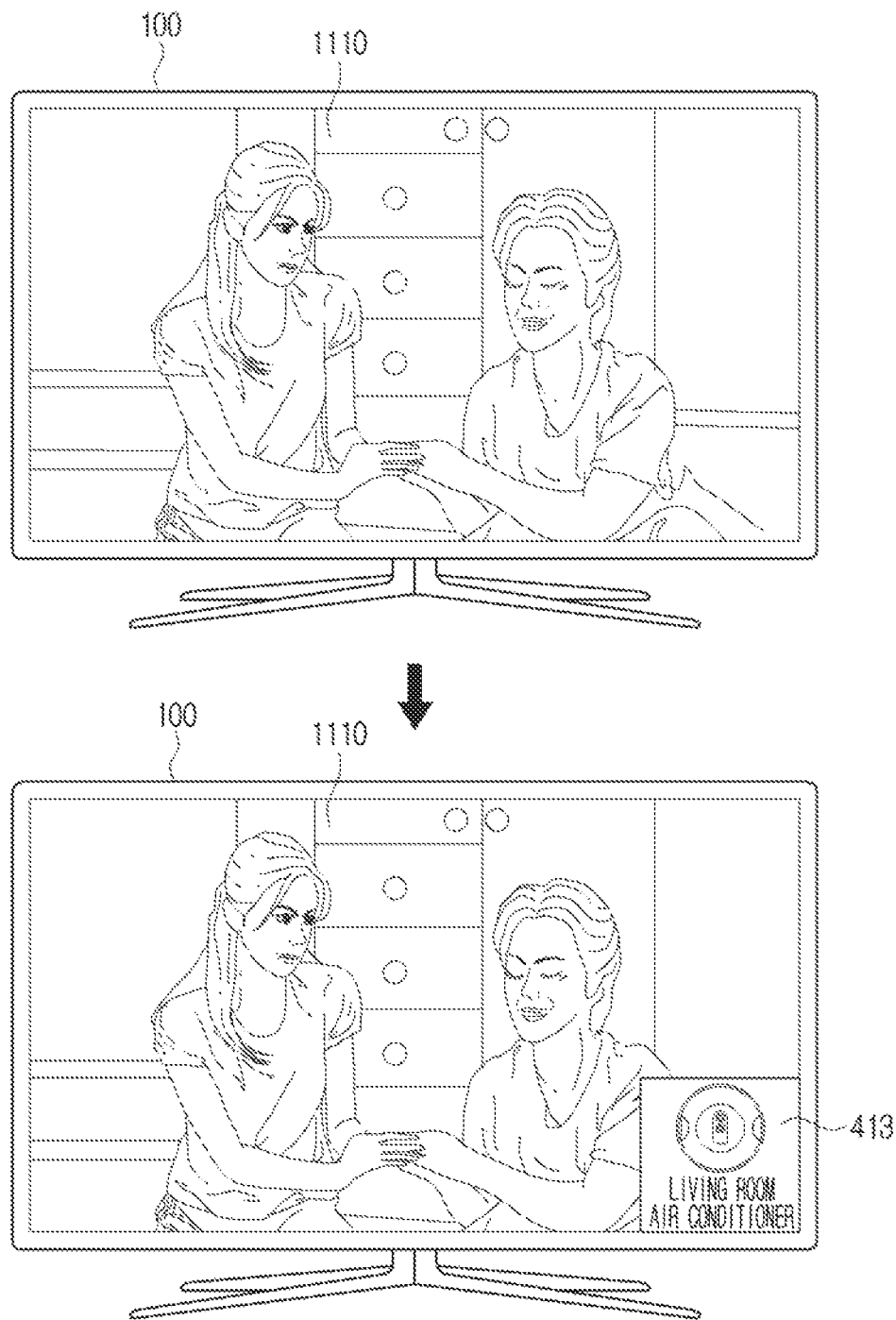

If the image content is identified as content selected by the user (S1030:Y), at operation S1040, the processor 120 may display a device control UI at a partial area of the display 110 based on the first type UI (S1040). As shown in FIG. 11A, according to an embodiment, if the live broadcast content selected by the user is being provided in full screen, then the device control UI 413 may be displayed at a partial area of the display 110 based on the first type UI.

Figure 11B:
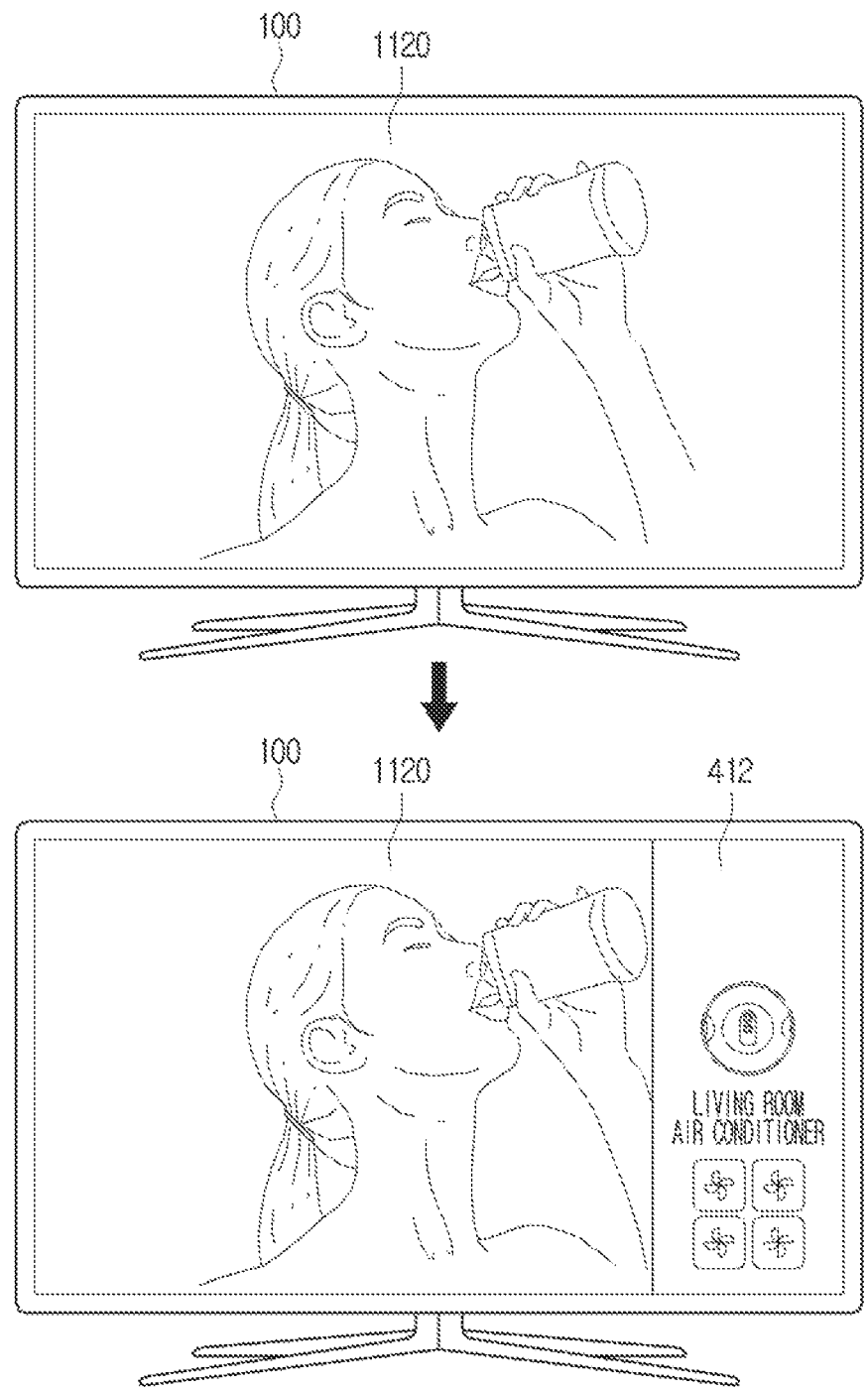

If the image content is identified as content not selected by the user (S1030:N), at operation S1050, the processor 120 may display a device control UI at a partial area of the display 110 based on the second type UI (S1050). Here, the size of the second type UI may be relatively greater than the size of the first type UI. As shown in FIG. 11B, according to an embodiment, if an advertisement content not selected by the user is provided in full screen, then the device control UI 412 may be displayed at a partial area of the display 110 based on the second type UI.

Figure 11C:
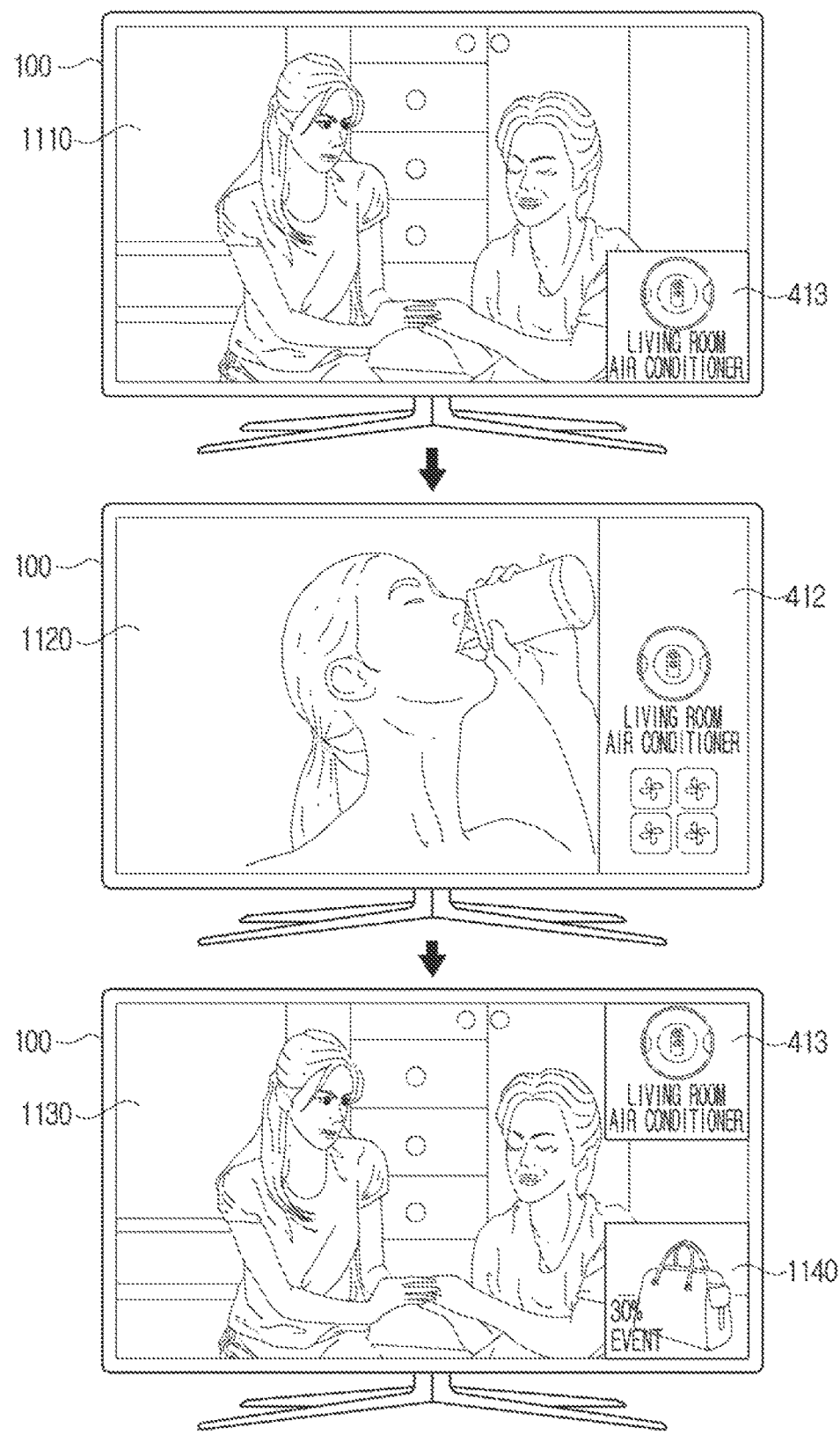

As shown in FIG. 11C, according to an embodiment, if a live broadcast content 1110, an advertisement content 1120, and a live broadcast content 1130 are sequentially provided, then the UI may be changed and displayed in a first type UI 413>second type UI 412>first type UI 413 order.

According to one or more embodiments, a position at which a device control UI is provided may be changed based on at least one from among the content type or the display state of the content displayed in the display 110. As shown in FIG. 11C, according to an embodiment, if an advertisement content 1140 requested by a third party is provided at one area of the screen, then the first type UI 413 may be provided avoiding the corresponding area.

As shown in FIG. 11C, according to an embodiment, the size of the first type UI and the second type UI may be changed. For example, the size of the first type UI may gradually increase and change to the second type UI, or the size of the second type UI may gradually decrease and change to the first type UI.

Figure 12A:
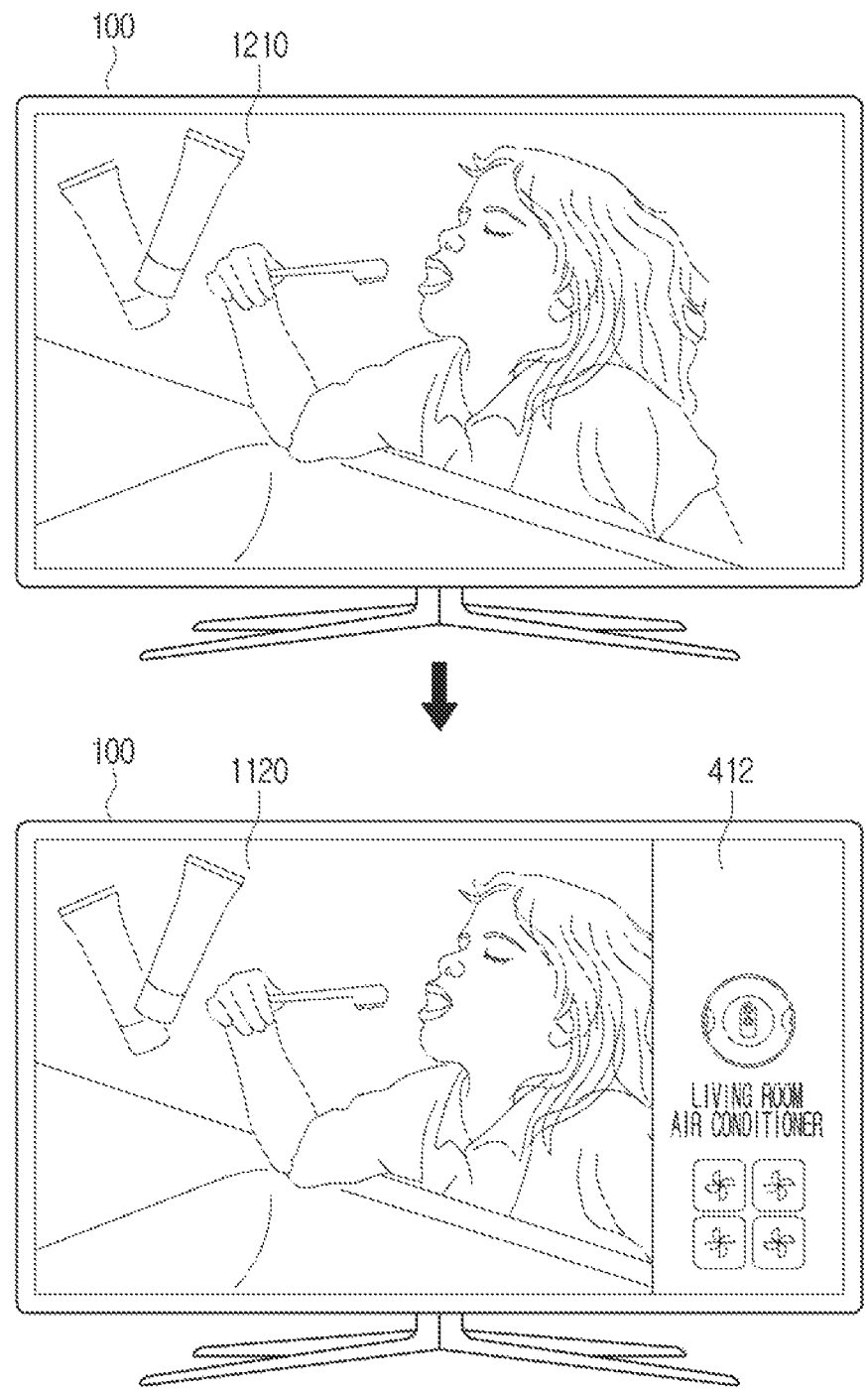
FIGS. 12A and 12B are diagrams illustrating a device control UI providing method associated with a user preference according to one or more embodiments.
Figure 12B:
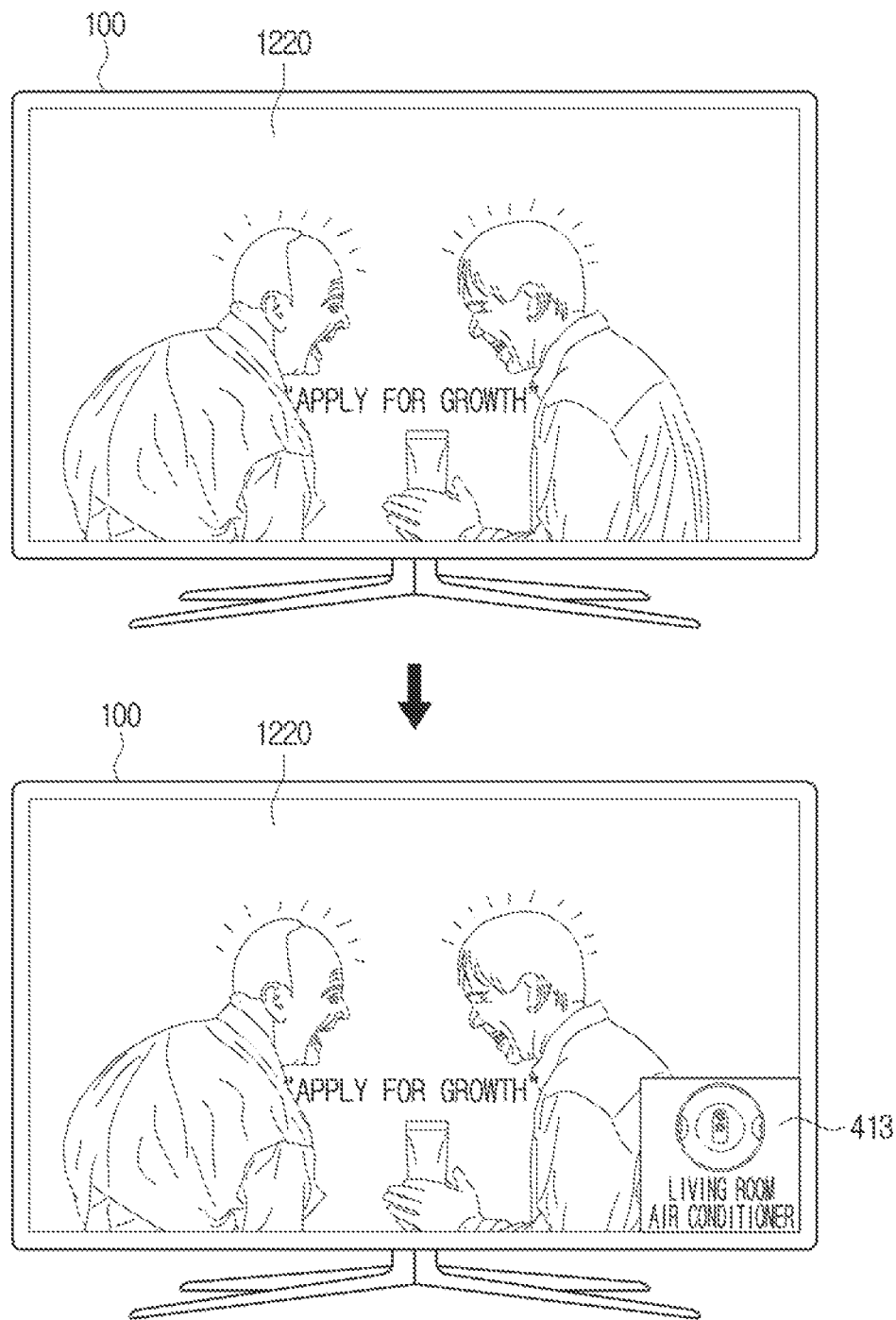

FIGS. 12A and 12B are diagrams illustrating a device control UI providing method associated with a user preference according to one or more embodiments.

Referring to FIGS. 12A and 12B, according to an embodiment, the processor 120 may provide device control UIs of different types based on a user preference. According to an embodiment, a device control UI of a different type may be provided based on the user preference even if it is a content of a same type.

As shown in FIGS. 12A and 12B, according to an embodiment, the processor 120 may provide, based on an advertisement content being provided in full screen, the first type UI or the second type UI based on a user preference of the advertisement content. For example, if the user is quite interested in hair loss management, the second type UI 412 which hides a portion of the screen may be provided if an advertisement content unrelated to hair loss management as in FIG. 12A is provided, and the first type UI 413 which hides the screen to a minimum may be provided if an advertisement content related to hair loss management as in FIG. 12B is provided. For example, the user preference may be identified based on a user use history, a user input, a user profile, and the like.

Figure 13A:
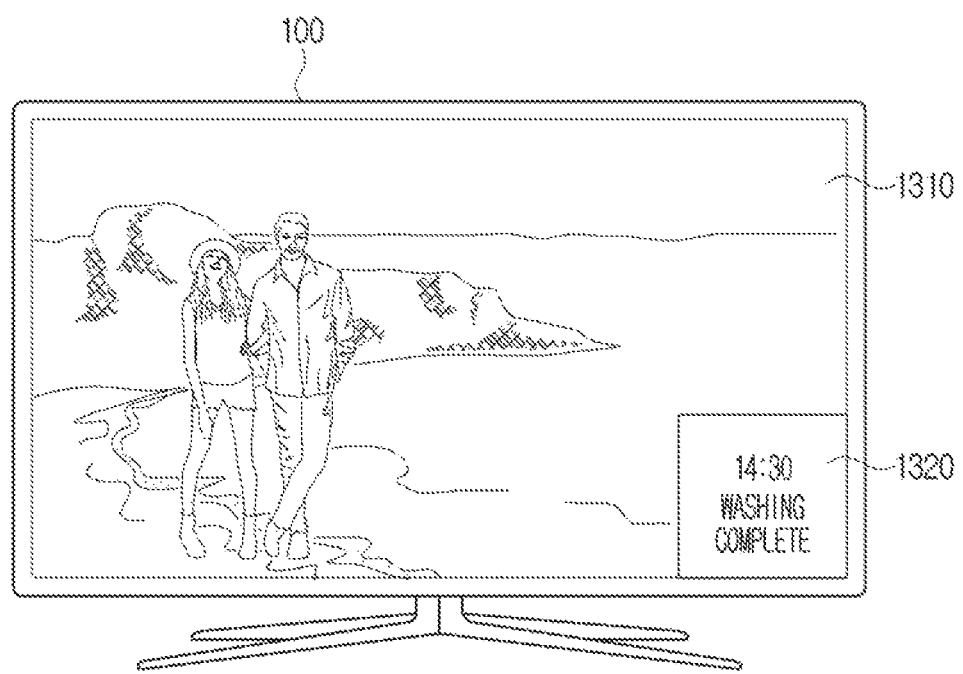
FIGS. 13A and 13B are diagrams illustrating a notification UI providing method according to one or more embodiments.
Figure 13B:
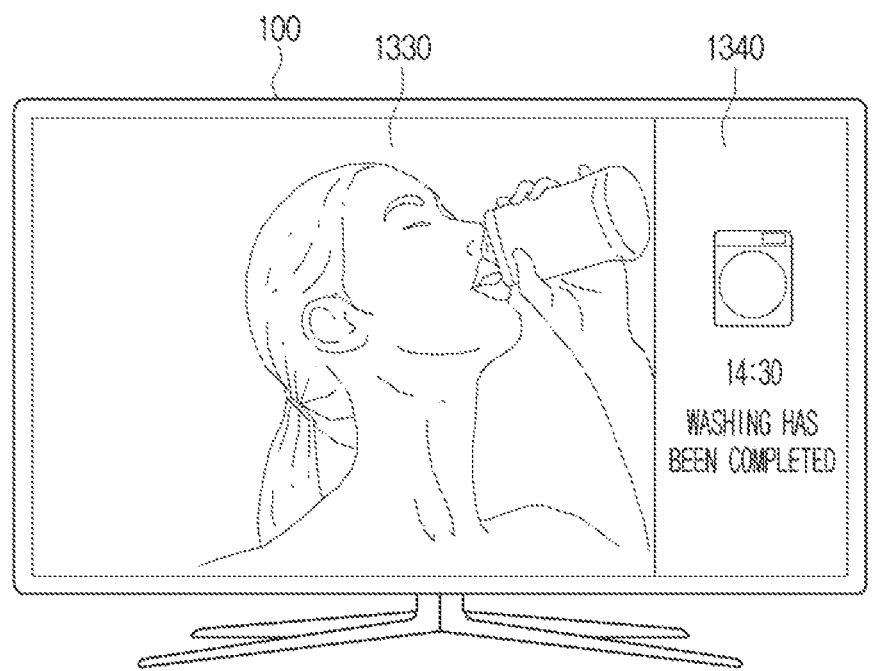

FIGS. 13A and 13B are diagrams illustrating a notification UI providing method according to one or more embodiments.

Referring to FIGS. 13A and 13B, according to an embodiment, the processor 120 may provide, based on notification information associated with an operation of a peripheral device being received, UIs in different forms according to the screen state of the display 110. For example, the processor 120 may provide notification information associated with an operation of the peripheral device in different forms based on at least one from among the content type or the playback state of the content.

As shown in FIG. 13A, according to an embodiment, when washing notification information is received from a washer while a live broadcast image 1310 is being provided in full screen, the processor 120 may provide the corresponding notification information 1320 in a size that covers the screen to a minimum. For example, it may be provided in a same size as the first type UI.

As shown in FIG. 13B, according to an embodiment, when washing notification information is received from the washer while in an advertisement content 1330 is being provided in full screen, the processor 120 may provide the corresponding notification information in a size 1340 larger than that of FIG. 13A. For example, it may be provided in a same size as the second type UI. Notification information of the size 1340 provided in an embodiment of FIG. 13B may include relatively more information than notification information 1320 provided in the embodiment of FIG. 13A.

Even when notification information associated with an operation of the peripheral device is provided as described above, various embodiments that are the same or similar with the one or more embodiments that provide the device control UI may be applicable.

Figure 14A:
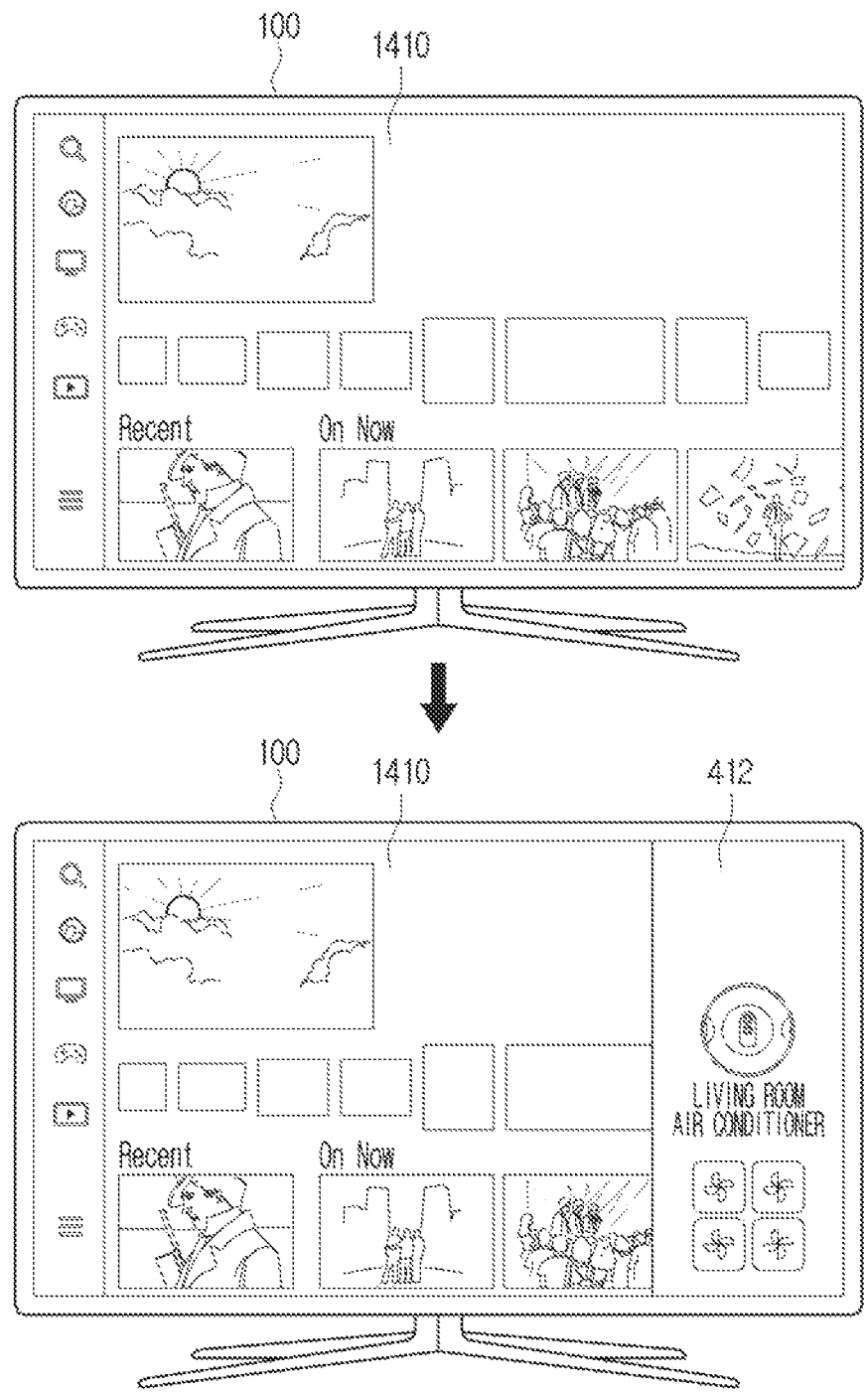
FIGS. 14A and 14B are diagrams illustrating a displaying method of a device control UI according to one or more embodiments.
Figure 14B:
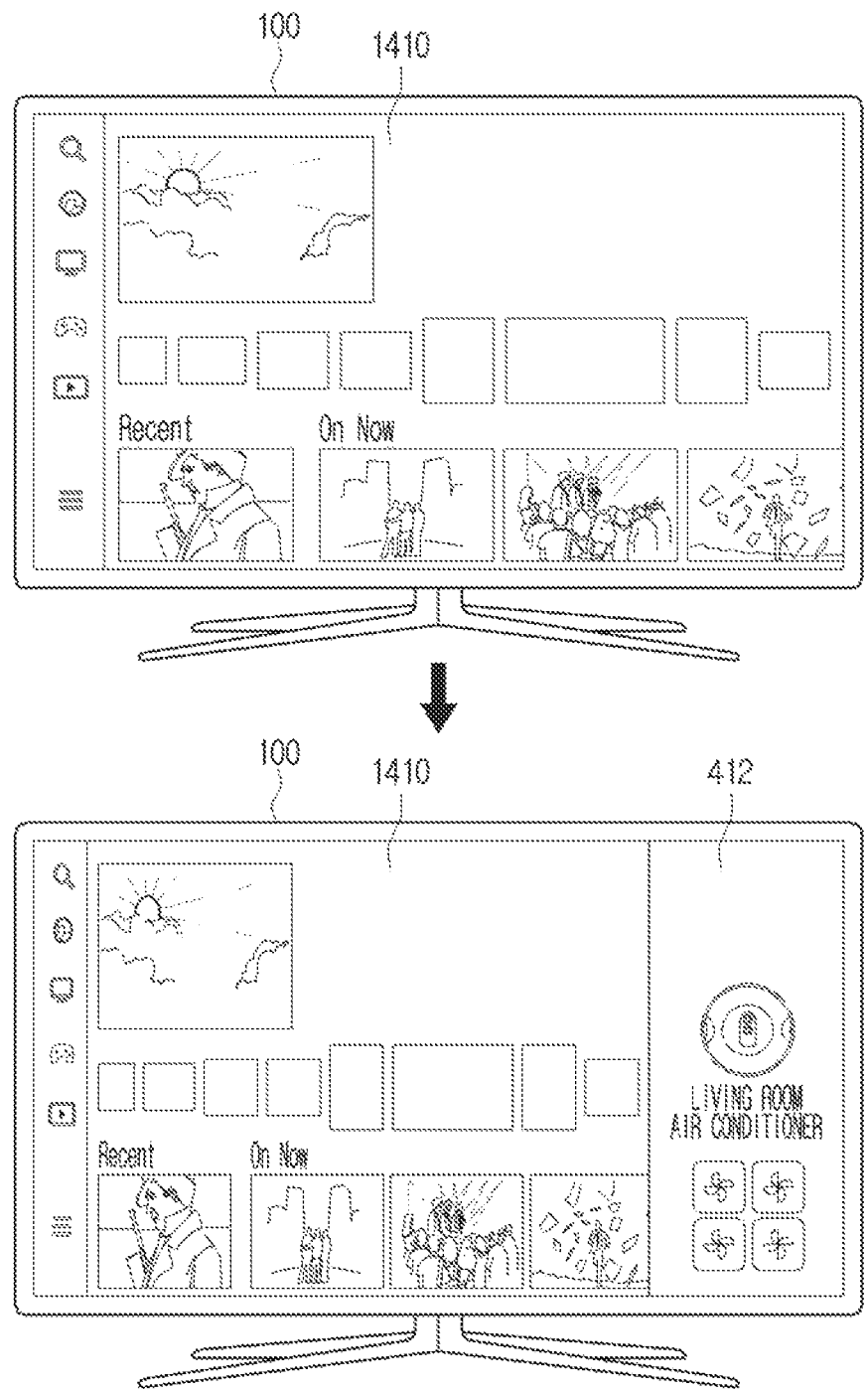

FIGS. 14A and 14B are diagrams illustrating a displaying method of a device control UI according to one or more embodiments.

Referring to FIGS. 14A and 14B, according to an embodiment, the processor 120 may provide, based on a device control UI being provided according to a user command while a content is being provided, a content by scaling, or a device control UI on the content in an OSD form. According to an embodiment, the processor 120 may provide, based on at least one from among the content type or the playback state of the content, the content by scaling, or provide the device control UI on the content in the OSD form.

As shown in FIG. 14A, according to an embodiment, when a user command for executing the peripheral device control function is identified while a home screen content 1410 (e.g., TV home screen) is being provided in full screen, the processor 120 may provide the second type UI 142 to cover a partial area of a home screen content.

As shown in FIG. 14B, according to an embodiment, when a user command for executing the peripheral device control function is identified while the home screen content 1410 (e.g., TV home screen) is being provided in full screen, the processor 120 may provide the home screen content by scaling to correspond to the remaining area other than the area at which the second type UI 142 is provided.

However, according to one or more embodiments, the processor 120 may determine not only the type of the device control UI, but also whether to perform scaling based on at least one from among the content type or the playback state of the content. For example, when a specific type UI is identified based on the content type, whether to perform scaling of the content may be identified based on the playback state of the content. For example, when the second type UI is identified based on a game content, the game content may be scaled and displayed such that the game content is not covered by the second type UI while the game content is being played back normally, and the second type UI may be provided such that a screen content that is being loaded is not scaled and a portion thereof is covered if the game content is being loaded.

Figure 15A:
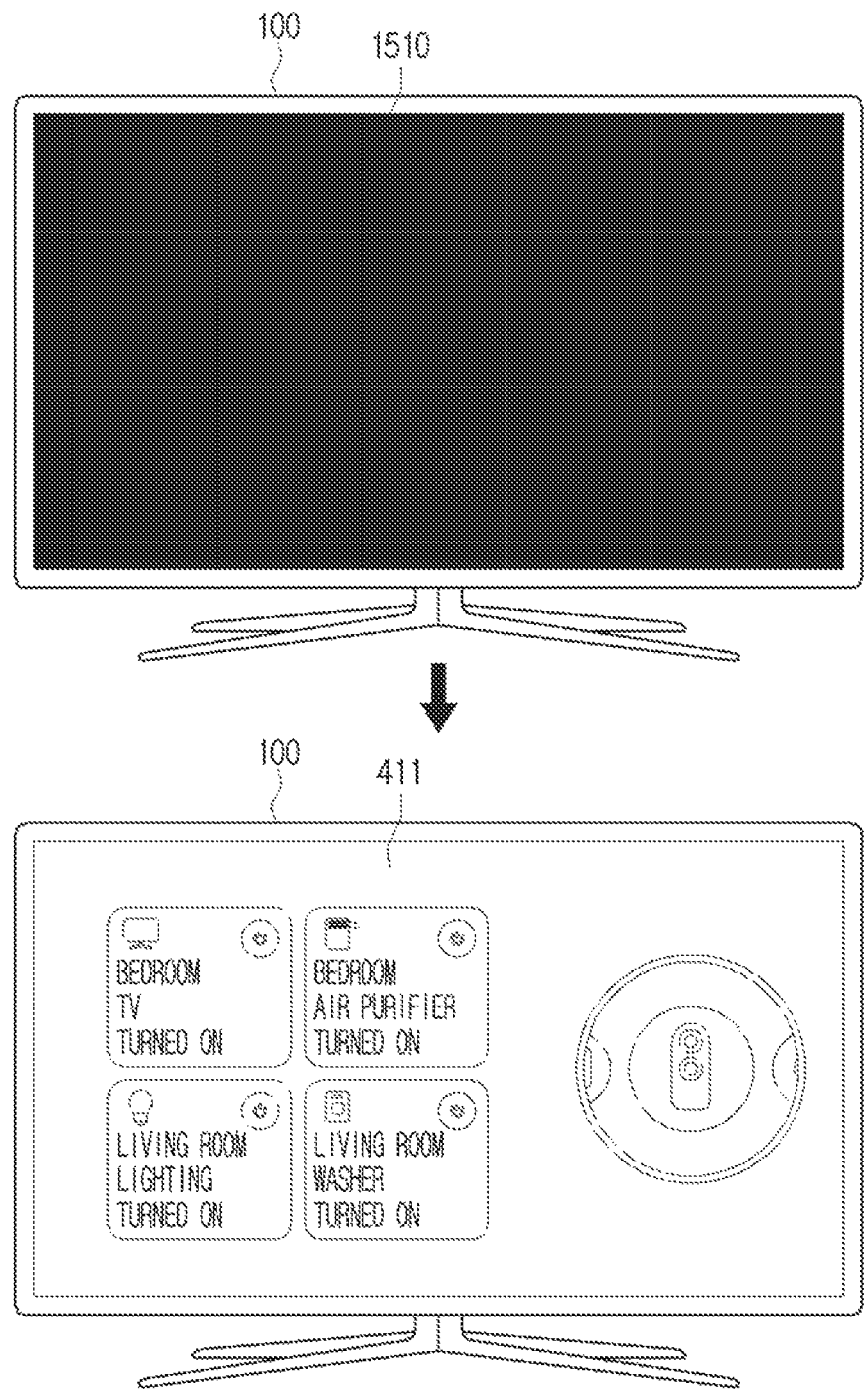
FIGS. 15A and 15B are diagrams illustrating a device control UI providing method in a screen off state and in an art mode according to one or more embodiments.
Figure 15B:
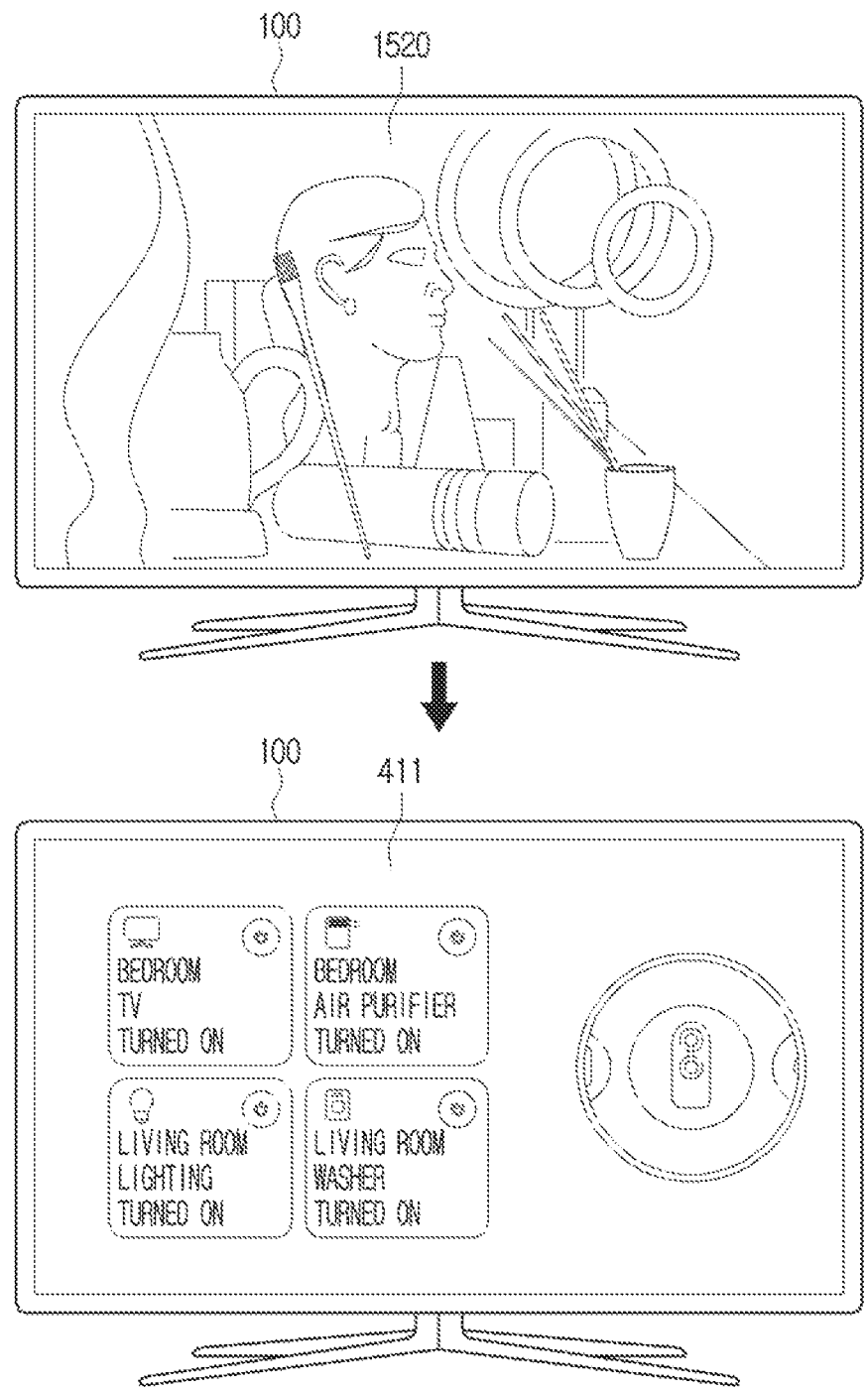

FIGS. 15A and 15B are diagrams illustrating a device control UI providing method in a screen off state and in an art mode according to one or more embodiments.

Referring to FIG. 15A, according to an embodiment, the processor 120 may provide, based on a user command for executing the peripheral device control function being identified in a screen off state 1510, the device control UI 411 (FIG. 4) in the whole area of the screen.

Referring to FIG. 15B, according to an embodiment, the processor may provide, based on a user command for executing the peripheral device control function being identified in an art mode in which an art content 1520 is displayed, the device control UI 411 (FIG. 4) at the whole area of the screen. That is, the processor 120 may provide the device control UI 411 (FIG. 4) at the whole area of the screen as same as with the screen off state in the art mode which is separately defined even when in the screen turned on state.

Figure 16A:
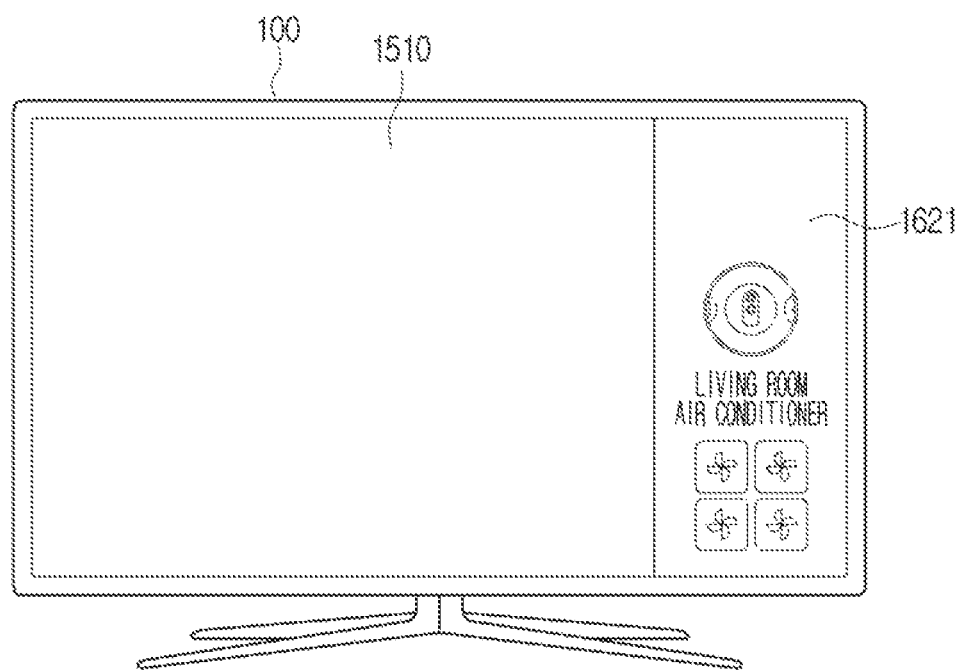
FIGS. 16A, 16B, and 16C are diagrams illustrating a device control UI of various types according to one or more embodiments.
Figure 16B:
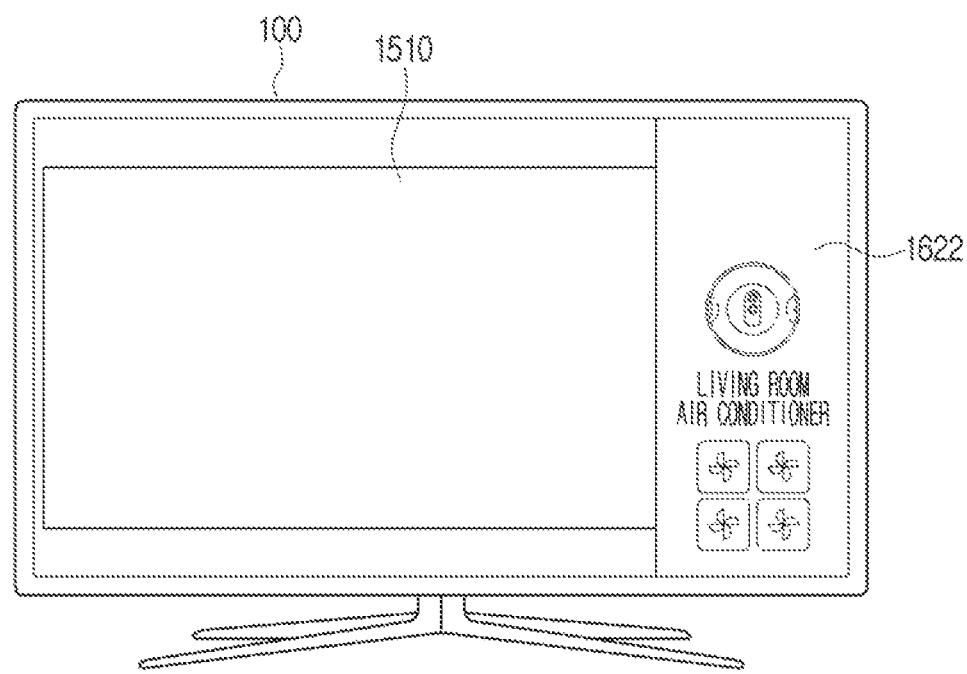
Figure 16C:
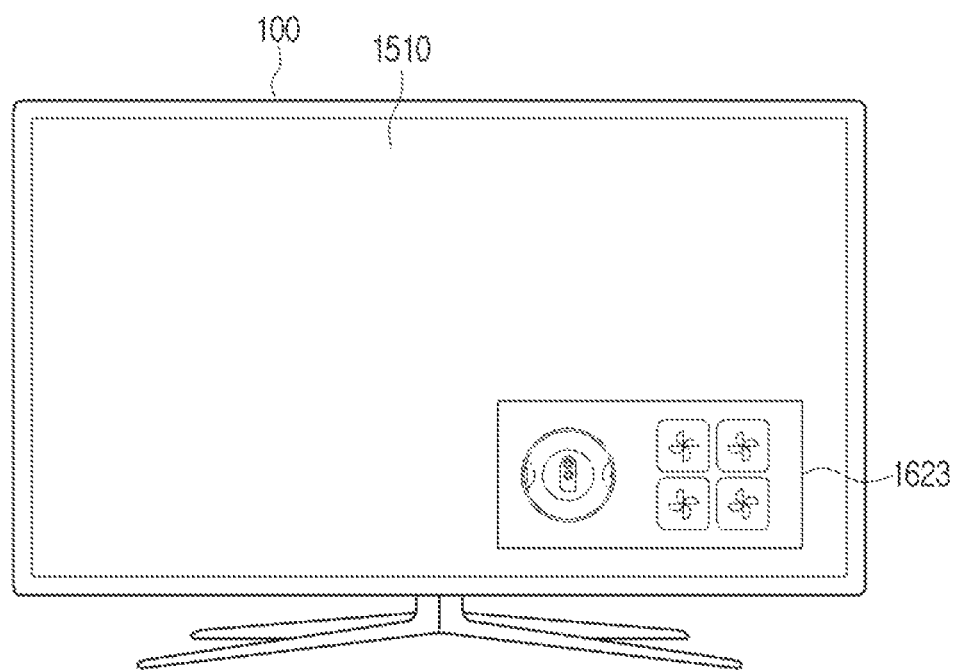

FIGS. 16A, 16B, and 16C are diagrams illustrating a device control UI of various types according to one or more embodiments.

Referring to FIGS. 16A-16C, according to an embodiment, the second type UI may be changed in design in various forms.

As shown in FIG. 16A, according to an embodiment, the second type UI may be in a form that is provided at a portion of one side area (e.g., right side area) of a screen 1610.

As shown in FIG. 16B, according to an embodiment, the second type UI may be in a form that is provided at one side area (e.g., right side area) of the screen 1610 and at a portion of at least one other side area (e.g., upper side and lower side area).

As shown in FIG. 16C, according to an embodiment, the second type UI may be in a form that is provided at a portion of any one area (e.g., right lower part area) from among the areas which divided the screen 1610 into a quadrant.

However, the form shown in FIGS. 16A-16C is merely an example, may be changed to various forms within a limitation of the size being greater than the first type UI and being provided at only a partial area of the screen as shown in FIG. 4C.

In the embodiments described above, the UI that is provided at a partial area of the display 110 has been described as being two types (first type UI, second type UI), but is not limited thereto, and UIs of three types or more may be provided according to the size of the device control UI and/or a number of information included therein, and the like.

According to the various embodiments described above, because the device control UI of a different size can be provided based on the content type and/or the screen state when executing the peripheral device control function in an electronic apparatus such as a TV, a level of viewing immersion of a user may not be disturbed too much.

The methods according to one or more embodiments described above may be implemented in an application form installable in an electronic apparatus of the related art. Alternatively, at least a portion from among the methods according to one or more embodiments of the disclosure described above may be performed using a deep learning-based artificial intelligence model, that is, a learning network model.

In addition, the methods according to the various embodiments of the disclosure described above may be implemented with only a software upgrade or a hardware upgrade of the electronic apparatus of the related art.

In addition, the various embodiments of the disclosure described above may be performed through an embedded server provided in the electronic apparatus or an external server of the electronic apparatus.

According to one or more embodiments of the disclosure, the various embodiments described above may be implemented with software including instructions stored in a machine-readable storage media (e.g., computer). The machine may call an instruction stored in the storage medium, and as a device operable according to the called instruction, may include an electronic apparatus (e.g., electronic apparatus) according to the above-mentioned embodiments. Based on an instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, according to one or more embodiments of the disclosure, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, each of the elements (e.g., a module or a program) according to the various embodiments described above may be formed as a single entity or a plurality of entities, and some sub-elements of the above-mentioned sub-elements may be omitted, or other sub-elements may be further included in the various embodiments. Alternatively or additionally, some elements (e.g., modules or programs) may be integrated into one entity to perform the same or similar functions performed by the respective corresponding elements prior to integration. Operations performed by a module, a program, or another element, in accordance with various embodiments, may be executed sequentially, in a parallel, repetitively, or in a heuristic manner, or at least some operations may be executed in a different order, omitted or a different operation may be added.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic apparatus comprising:
a display;
a memory storing at least one instruction; and
at least one processor configured to execute the at least one instruction to:
based on a user command for executing a peripheral device control function being identified, identify a screen state of the display,
control the display to display a user interface (UI) screen corresponding to the peripheral device control function at a whole area of the display by turning on the display based on the identified screen state being in a turned off state,
based on the identified screen state being in a turned on state, identify a UI type from among a plurality of UI types with a different size based on at least one of a content type or a display state of content displayed on the display, and
control the display to display a UI screen corresponding to the peripheral device control function at a partial area of the display based on the identified UI type.

2. The electronic apparatus of claim 1, wherein the at least one processor is further configured to execute the at least one instruction to:
based on the identified screen state being in a turned on state, identify whether an image content is displayed at a whole area of the display, and
based on the image content being identified as displayed at the whole area of the display, identify the UI type from among the plurality of UI types based on at least one of a type of the image content or a playback state of the image content.

3. The electronic apparatus of claim 2, wherein the at least one processor is further configured to execute the at least one instruction to:
based on the image content being identified as displayed at the whole area of the display, identify whether the image content is content selected by a user,
based on the image content being identified as content selected by the user, display a UI screen corresponding to the peripheral device control function at a partial area of the display based on a first type UI, and
based on the image content being identified as not the content selected by the user, display a UI screen corresponding to the peripheral device control function at a partial area of the display based on a second type UI, and
wherein the second type UI is greater in size than the first type UI.

4. The electronic apparatus of claim 2, wherein the at least one processor is further configured to execute the at least one instruction to:
based on the image content being identified as displayed at the whole area of the display, identify whether the image content is being played back normally,
based on the image content being identified as being played back normally, display a UI screen corresponding to the peripheral device control function at a partial area of the display based on a first type UI, and
based on the image content being identified as not being played back normally, display a UI screen corresponding to the peripheral device control function at a partial area of the display based on a second type UI, and
wherein the second type UI is greater in size than the first type UI.

5. The electronic apparatus of claim 1, wherein the at least one processor is further configured to execute the at least one instruction to:
based on the identified screen state being in a turned on state, identify whether the image content is displayed at the whole area of the display, and
based on the image content being identified as not displayed at the whole area of the display, identify the UI type from among the plurality of UI types based on at least one of a priority of the content type displayed in at least a partial area of the display or a priority of a UI screen for controlling the peripheral device.

6. The electronic apparatus of claim 1, wherein the at least one processor is further configured to execute the at least one instruction to:
based on the image content being identified as not displayed at the whole area of the display, identify a level of user operation required for content that is displayed in at least a partial area of the display,
based on the level of user operation required being greater than or equal to a threshold level required, display a UI screen corresponding to the peripheral device control function at a partial area of the display based on a first type UI, and
based on the level of user operation required being less than the threshold level required, display a UI screen corresponding to the peripheral device control function at a partial area of the display based on a second type UI, and
wherein the second type UI is greater in size than the first type UI.

7. The electronic apparatus of claim 1, wherein the at least one processor is further configured to execute the at least one instruction to:
based on a first content being displayed at a partial area of the display and a second content being displayed at a remaining area of the display, identify the UI type from among the plurality of UI types based on a type of the first content and a type of the second content;
identify an area of the display at which the UI screen is to be displayed based on the type of the first content and the type of the second content; and
control the display to display a UI screen corresponding to the peripheral device control function at an identified area of the display based on the identified UI type.

8. The electronic apparatus of claim 1, wherein the at least one processor is further configured to execute the at least one instruction to:
based on a user command being displayed on the display for executing the peripheral device control function being identified in an art mode in which an art content is displayed, control the display to display a UI screen corresponding to the peripheral device control function at the whole area of the display.

9. The electronic apparatus of claim 1, wherein the at least one processor is further configured to execute the at least one instruction to:
based on notification information associated with an operation of the peripheral device being received, provide a guide UI comprising the notification information in a different form according to the screen state of the display.

10. The electronic apparatus of claim 1, wherein the at least one processor is further configured to execute the at least one instruction to:
based on the identified screen state being in a turned on state, identify a position to display the UI screen based on at least one content type displayed in the display and a display state of the at least one content, and
control the display to display the UI screen at the identified position.

11. A method of providing a user interface (UI), the method comprising:
based on a user command for executing a peripheral device control function being identified, identifying a screen state of a display;
based on the identified screen state being in a turned off state, displaying a UI screen corresponding to the peripheral device control function at a whole area of the display by turning on the display;
based on the identified screen state being in a turned on state, identifying a UI type from among a plurality of UI types with a different size based on at least one of a content type being displayed in the display or a display state of content; and
displaying a UI screen corresponding to the peripheral device control function at a partial area of the display based on the identified UI type.

12. The method of claim 11, wherein the identifying the UI type with the different size from the plurality of UI types comprises:
based on the identified screen state being in a turned on state, identifying whether an image content is being displayed at the whole area of the display; and
based on the image content being identified as displayed at the whole area of the display, identifying the UI type from the plurality of UI types based on at least one of a type of the image content or a playback state of the image content.

13. The method of claim 12, further comprising:
based on the image content being identified as displayed at the whole area of the display, identifying whether the image content is content selected by a user;
based on the image content being identified as content selected by the user, displaying a UI screen corresponding to the peripheral device control function at a partial area of the display based on a first type UI; and
based on the image content being identified as content not selected by the user, displaying a UI screen corresponding to the peripheral device control function at a partial area of the display based on a second type UI,
wherein the second type UI is greater in size than the first type UI.

14. The method of claim 12, further comprising:
based on the image content being identified as displayed at the whole area of the display, identifying whether the image content is being played back normally;
based on the image content being identified as being played back normally, displaying a UI screen corresponding to the peripheral device control function at a partial area of the display based on a first type UI; and
based on the image content being identified as not being played back normally, displaying a UI screen corresponding to the peripheral device control function at a partial area of the display based on a second type UI,
wherein the second type UI is greater in size than the first type UI.

15. The method of claim 11, wherein the identifying the UI type with the different size from the plurality of UI types comprises:
based on the identified screen state being in a turned on state, identifying whether an image content is being displayed at the whole area of the display device; and
based on the image content being identified as not displayed at the whole area of the display device, identifying the UI type from the plurality of UI types based on at least one of a priority of the content type displayed in at least a partial area of the display device or a priority of a UI screen for controlling the peripheral device.

16. The method of claim 11, wherein the identifying the UI type with the different size from the plurality of UI types comprises:
based on the identified screen state being in a turned on state, identifying whether an image content is being displayed at the whole area of the display device; and
based on the image content being identified as not displayed at the whole area of the display device, identifying the UI type from the plurality of UI types based on a level of user operation required for content that is displayed in at least a partial area of the display device.

17. The method of claim 16, further comprising:
based on the level of user operation required being greater than or equal to a threshold level required, displaying a UI screen corresponding to the peripheral device control function at a partial area of the display device based on a first type UI; and
based on the level of user operation required being less than the threshold level required, displaying a UI screen corresponding to the peripheral device control function at a partial area of the display device based on a second type UI,
wherein the second type UI is greater in size than the first type UI.

18. The method of claim 11, further comprising:
based on a first content being displayed at a partial area of the display device and a second content being displayed at a remaining area of the display device, identifying the UI type from among the plurality of UI types based on a type of the first content and a type of the second content;
identifying an area of the display device at which the UI screen is to be displayed based on the type of the first content and the type of the second content; and
controlling the display device to display a UI screen corresponding to the peripheral device control function at an identified area of the display device based on the identified UI type.

19. The method of claim 11, further comprising:
based on the identified screen state being in a turned on state, identifying a position to display the UI screen based on at least one content type displayed in the display device and a display state of the at least one content; and
controlling the display device to display the UI screen at the identified position.

20. A non-transitory computer readable medium storing computer readable program code or instructions which are executable by a processor to perform a method of providing a user interface (UI), the method comprising:
based on a user command for executing a peripheral device control function being identified, identifying a screen state of a display;
based on the identified screen state being in a turned off state, displaying a UI screen corresponding to the peripheral device control function at a whole area of the display by turning on the display;
based on the identified screen state being in a turned on state, identifying a UI type from among a plurality of UI types with a different size based on at least one of a content type being displayed in the display or a display state of content; and
displaying a UI screen corresponding to the peripheral device control function at a partial area of the display based on the identified UI type.

* * * * *